US011720893B2

(12) United States Patent
Flurscheim et al.

(10) Patent No.: US 11,720,893 B2
(45) Date of Patent: Aug. 8, 2023

(54) SYSTEMS AND METHODS FOR CODE DISPLAY AND USE

(71) Applicant: Visa International Service Association, San Francisco, CA (US)

(72) Inventors: Christian Flurscheim, Walnut Creek, CA (US); Glenn Powell, Fremont, CA (US); Christian Aabye, Foster City, CA (US); Jalpesh Chitalia, Castro Valley, CA (US); Erick Wong, Vancouver (CA)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 17/349,708

(22) Filed: Jun. 16, 2021

(65) Prior Publication Data

US 2021/0312433 A1    Oct. 7, 2021

Related U.S. Application Data

(63) Continuation of application No. 15/421,891, filed on Feb. 1, 2017, now Pat. No. 11,080,696.
(Continued)

(51) Int. Cl.
*G06Q 20/38*       (2012.01)
*G06K 7/14*        (2006.01)
(Continued)

(52) U.S. Cl.
CPC ......... *G06Q 20/385* (2013.01); *G06K 7/1417* (2013.01); *G06Q 20/3276* (2013.01);
(Continued)

(58) Field of Classification Search
None
See application file for complete search history.

(56) References Cited

U.S. PATENT DOCUMENTS

| 5,613,012 A | 3/1997 | Hoffman et al. |
| 5,781,438 A | 7/1998 | Lee et al. |

(Continued)

FOREIGN PATENT DOCUMENTS

| CN | 102546648 A | 7/2012 |
| EP | 2156397 A1  | 2/2010 |

(Continued)

OTHER PUBLICATIONS

CN201780008623.5, "Office Action", dated Jan. 21, 2022, 3 pages.
(Continued)

*Primary Examiner* — Scott S Trotter
*Assistant Examiner* — Amit Patel
(74) *Attorney, Agent, or Firm* — Kilpatrick Townsend & Stockton LLP

(57) ABSTRACT

Embodiments of the present invention relate to systems and methods that allow users to use their communication devices to perform transactions (e.g., payment transactions, access transactions, etc.). To complete a transaction, a resource provider electronically generates a code representing transaction data and displays it on an access device. The user scans the code with his or her communication device using a camera associated with the communication device, for example. The code is interpreted by an application on the communication device. The user may request and receive a token at the communication device corresponding to sensitive information selected to perform the transaction (e.g., a primary account number). The user may then provide the token and the transaction data via the communication device to a server computer, which may facilitate completion of the transaction between the user and the resource provider using the transaction data and the token.

18 Claims, 11 Drawing Sheets

Related U.S. Application Data

(60) Provisional application No. 62/289,695, filed on Feb. 1, 2016.

(51) Int. Cl.
*G06Q 20/32* (2012.01)
*G06Q 20/40* (2012.01)
*G06Q 30/0251* (2023.01)

(52) U.S. Cl.
CPC ....... *G06Q 20/4018* (2013.01); *G06Q 20/382* (2013.01); *G06Q 20/3821* (2013.01); *G06Q 20/401* (2013.01); *G06Q 30/0253* (2013.01)

(56) References Cited

U.S. PATENT DOCUMENTS

| | | |
|---|---|---|
| 5,883,810 A | 3/1999 | Franklin et al. |
| 5,953,710 A | 9/1999 | Fleming |
| 5,956,699 A | 9/1999 | Wong et al. |
| 6,000,832 A | 12/1999 | Franklin et al. |
| 6,014,635 A | 1/2000 | Harris et al. |
| 6,044,360 A | 3/2000 | Picciallo |
| 6,163,771 A | 12/2000 | Walker et al. |
| 6,227,447 B1 | 5/2001 | Campisano |
| 6,236,981 B1 | 5/2001 | Hill |
| 6,267,292 B1 | 7/2001 | Walker et al. |
| 6,341,724 B2 | 1/2002 | Campisano |
| 6,385,596 B1 | 5/2002 | Wiser et al. |
| 6,422,462 B1 | 7/2002 | Cohen |
| 6,425,523 B1 | 7/2002 | Shem-Ur et al. |
| 6,592,044 B1 | 7/2003 | Wong et al. |
| 6,636,833 B1 | 10/2003 | Flitcroft et al. |
| 6,748,367 B1 | 6/2004 | Lee |
| 6,805,287 B2 | 10/2004 | Bishop et al. |
| 6,879,965 B2 | 4/2005 | Fung et al. |
| 6,891,953 B1 | 5/2005 | DeMello et al. |
| 6,901,387 B2 | 5/2005 | Wells et al. |
| 6,931,382 B2 | 8/2005 | Laage et al. |
| 6,938,019 B1 | 8/2005 | Uzo |
| 6,941,285 B2 | 9/2005 | Sarcanin |
| 6,980,670 B1 | 12/2005 | Hoffman et al. |
| 6,990,470 B2 | 1/2006 | Hogan et al. |
| 6,991,157 B2 | 1/2006 | Bishop et al. |
| 7,051,929 B2 | 5/2006 | Li |
| 7,069,249 B2 | 6/2006 | Stolfo et al. |
| 7,103,576 B2 | 9/2006 | Mann, III et al. |
| 7,113,930 B2 | 9/2006 | Eccles et al. |
| 7,136,835 B1 | 11/2006 | Flitcroft et al. |
| 7,177,835 B1 | 2/2007 | Walker et al. |
| 7,177,848 B2 | 2/2007 | Hogan et al. |
| 7,194,437 B1 | 3/2007 | Britto et al. |
| 7,209,561 B1 | 4/2007 | Shankar et al. |
| 7,264,154 B2 | 9/2007 | Harris |
| 7,287,692 B1 | 10/2007 | Patel et al. |
| 7,292,999 B2 | 11/2007 | Hobson et al. |
| 7,350,230 B2 | 3/2008 | Forrest |
| 7,353,382 B2 | 4/2008 | Labrou et al. |
| 7,379,919 B2 | 5/2008 | Hogan et al. |
| RE40,444 E | 7/2008 | Linehan |
| 7,415,443 B2 | 8/2008 | Hobson et al. |
| 7,444,676 B1 | 10/2008 | Asghari-Kamrani et al. |
| 7,469,151 B2 | 12/2008 | Khan et al. |
| 7,548,889 B2 | 6/2009 | Bhambri et al. |
| 7,567,934 B2 | 7/2009 | Flitcroft et al. |
| 7,567,936 B1 | 7/2009 | Peckover et al. |
| 7,571,139 B1 | 8/2009 | Giordano et al. |
| 7,571,142 B1 | 8/2009 | Flitcroft et al. |
| 7,580,898 B2 | 8/2009 | Brown et al. |
| 7,584,153 B2 | 9/2009 | Brown et al. |
| 7,593,896 B1 | 9/2009 | Flitcroft et al. |
| 7,606,560 B2 | 10/2009 | Labrou et al. |
| 7,627,531 B2 | 12/2009 | Breck et al. |
| 7,627,895 B2 | 12/2009 | Gifford et al. |
| 7,650,314 B1 | 1/2010 | Saunders |
| 7,685,037 B2 | 3/2010 | Reiners et al. |
| 7,702,578 B2 | 4/2010 | Fung et al. |
| 7,707,120 B2 | 4/2010 | Dominguez et al. |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II et al. |
| 7,784,685 B1 | 8/2010 | Hopkins, III |
| 7,793,851 B2 | 9/2010 | Mullen |
| 7,801,826 B2 | 9/2010 | Labrou et al. |
| 7,805,376 B2 | 9/2010 | Smith |
| 7,805,378 B2 | 9/2010 | Berardi et al. |
| 7,818,264 B2 | 10/2010 | Hammad |
| 7,828,220 B2 | 11/2010 | Mullen |
| 7,835,960 B2 | 11/2010 | Breck et al. |
| 7,841,523 B2 | 11/2010 | Oder, II et al. |
| 7,841,539 B2 | 11/2010 | Hewton |
| 7,844,550 B2 | 11/2010 | Walker et al. |
| 7,848,980 B2 | 12/2010 | Carlson |
| 7,849,020 B2 | 12/2010 | Johnson |
| 7,853,529 B1 | 12/2010 | Walker et al. |
| 7,853,995 B2 | 12/2010 | Chow et al. |
| 7,865,414 B2 | 1/2011 | Fung et al. |
| 7,873,579 B2 | 1/2011 | Hobson et al. |
| 7,873,580 B2 | 1/2011 | Hobson et al. |
| 7,890,393 B2 | 2/2011 | Talbert et al. |
| 7,891,563 B2 | 2/2011 | Oder, II et al. |
| 7,896,238 B2 | 3/2011 | Fein et al. |
| 7,908,216 B1 | 3/2011 | Davis et al. |
| 7,922,082 B2 | 4/2011 | Muscato |
| 7,931,195 B2 | 4/2011 | Mullen |
| 7,938,318 B2 | 5/2011 | Fein et al. |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders et al. |
| 8,046,256 B2 | 10/2011 | Chien et al. |
| 8,060,448 B2 | 11/2011 | Jones |
| 8,060,449 B1 | 11/2011 | Zhu |
| 8,074,877 B2 | 12/2011 | Mullen et al. |
| 8,074,879 B2 | 12/2011 | Harris |
| 8,082,210 B2 | 12/2011 | Hansen et al. |
| 8,095,113 B2 | 1/2012 | Kean et al. |
| 8,104,679 B2 | 1/2012 | Brown |
| RE43,157 E | 2/2012 | Bishop et al. |
| 8,109,436 B1 | 2/2012 | Hopkins, III |
| 8,121,942 B2 | 2/2012 | Carlson et al. |
| 8,121,956 B2 | 2/2012 | Carlson et al. |
| 8,126,449 B2 | 2/2012 | Beenau et al. |
| 8,132,723 B2 | 3/2012 | Hogg et al. |
| 8,171,525 B1 | 5/2012 | Pelly et al. |
| 8,196,813 B2 | 6/2012 | Vadhri |
| 8,205,791 B2 | 6/2012 | Randazza et al. |
| 8,219,489 B2 | 7/2012 | Patterson |
| 8,224,702 B2 | 7/2012 | Mengerink et al. |
| 8,225,385 B2 | 7/2012 | Chow et al. |
| 8,229,852 B2 | 7/2012 | Carlson |
| 8,265,993 B2 | 9/2012 | Chien et al. |
| 8,280,777 B2 | 10/2012 | Mengerink et al. |
| 8,281,991 B2 | 10/2012 | Wentker et al. |
| 8,328,095 B2 | 12/2012 | Oder, II et al. |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders et al. |
| 8,401,539 B2 | 3/2013 | Beenau et al. |
| 8,401,898 B2 | 3/2013 | Chien et al. |
| 8,402,555 B2 | 3/2013 | Grecia |
| 8,403,211 B2 | 3/2013 | Brooks et al. |
| 8,412,623 B2 | 4/2013 | Moon et al. |
| 8,412,837 B1 | 4/2013 | Emigh et al. |
| 8,417,642 B2 | 4/2013 | Oren |
| 8,447,699 B2 | 5/2013 | Batada et al. |
| 8,453,223 B2 | 5/2013 | Svigals et al. |
| 8,453,925 B2 | 6/2013 | Fisher et al. |
| 8,458,487 B1 | 6/2013 | Palgon et al. |
| 8,484,134 B2 | 7/2013 | Hobson et al. |
| 8,485,437 B2 | 7/2013 | Mullen et al. |
| 8,494,959 B2 | 7/2013 | Hathaway et al. |

(56) References Cited

U.S. PATENT DOCUMENTS

| | | |
|---|---|---|
| 8,498,908 B2 | 7/2013 | Mengerink et al. |
| 8,504,475 B2 | 8/2013 | Brand et al. |
| 8,504,478 B2 | 8/2013 | Saunders et al. |
| 8,510,816 B2 | 8/2013 | Quach et al. |
| 8,533,860 B1 | 9/2013 | Grecia |
| 8,538,845 B2 | 9/2013 | Liberty |
| 8,555,079 B2 | 10/2013 | Shablygin et al. |
| 8,566,168 B1 | 10/2013 | Bierbaum et al. |
| 8,567,670 B2 | 10/2013 | Stanfield et al. |
| 8,571,939 B2 | 10/2013 | Lindsey et al. |
| 8,577,336 B2 | 11/2013 | Mechaley, Jr. |
| 8,577,803 B2 | 11/2013 | Chatterjee et al. |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | McGuire et al. |
| 8,589,237 B2 | 11/2013 | Fisher |
| 8,589,271 B2 | 11/2013 | Evans |
| 8,589,291 B2 | 11/2013 | Carlson et al. |
| 8,589,300 B2 | 11/2013 | Hammad et al. |
| 8,595,098 B2 | 11/2013 | Starai et al. |
| 8,595,812 B2 | 11/2013 | Bomar et al. |
| 8,595,850 B2 | 11/2013 | Spies et al. |
| 8,606,638 B2 | 12/2013 | Dragt |
| 8,606,700 B2 | 12/2013 | Carlson et al. |
| 8,606,720 B1 | 12/2013 | Baker et al. |
| 8,615,468 B2 | 12/2013 | Varadarajan |
| 8,620,754 B2 | 12/2013 | Fisher |
| 8,635,157 B2 | 1/2014 | Smith et al. |
| 8,646,059 B1 | 2/2014 | von Behren et al. |
| 8,651,374 B2 | 2/2014 | Brabson et al. |
| 8,656,180 B2 | 2/2014 | Shablygin et al. |
| 8,751,391 B2 | 6/2014 | Freund |
| 8,762,263 B2 | 6/2014 | Gauthier et al. |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 11,080,696 B2 | 8/2021 | Flurscheim et al. |
| 2001/0029485 A1 | 10/2001 | Brody et al. |
| 2001/0034720 A1 | 10/2001 | Armes |
| 2001/0054003 A1 | 12/2001 | Chien et al. |
| 2002/0007320 A1 | 1/2002 | Hogan et al. |
| 2002/0016749 A1 | 2/2002 | Borecki et al. |
| 2002/0029193 A1 | 3/2002 | Ranjan et al. |
| 2002/0035548 A1 | 3/2002 | Hogan et al. |
| 2002/0069165 A1 | 6/2002 | O'Neil |
| 2002/0073027 A1 | 6/2002 | Hui et al. |
| 2002/0073045 A1 | 6/2002 | Rubin et al. |
| 2002/0116329 A1 | 8/2002 | Serbetcioglu et al. |
| 2002/0116341 A1 | 8/2002 | Hogan et al. |
| 2002/0133467 A1 | 9/2002 | Hobson et al. |
| 2002/0147913 A1 | 10/2002 | Lun Yip |
| 2003/0028481 A1 | 2/2003 | Flitcroft et al. |
| 2003/0089767 A1 | 5/2003 | Kiyomatsu |
| 2003/0130955 A1 | 7/2003 | Hawthorne |
| 2003/0135470 A1 | 7/2003 | Beard |
| 2003/0182207 A1 | 9/2003 | Skinner |
| 2003/0191709 A1 | 10/2003 | Elston et al. |
| 2003/0191945 A1 | 10/2003 | Keech |
| 2004/0010462 A1 | 1/2004 | Moon et al. |
| 2004/0050928 A1 | 3/2004 | Bishop et al. |
| 2004/0059682 A1 | 3/2004 | Hasumi et al. |
| 2004/0068465 A1 | 4/2004 | Nagamine et al. |
| 2004/0093281 A1 | 5/2004 | Silverstein et al. |
| 2004/0139008 A1 | 7/2004 | Mascavage, III |
| 2004/0143532 A1 | 7/2004 | Lee |
| 2004/0158532 A1 | 8/2004 | Breck et al. |
| 2004/0210449 A1 | 10/2004 | Breck et al. |
| 2004/0210498 A1 | 10/2004 | Freund |
| 2004/0232225 A1 | 11/2004 | Bishop et al. |
| 2004/0260646 A1 | 12/2004 | Berardi et al. |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0211771 A1 | 9/2005 | Onozu |
| 2005/0246293 A1 | 11/2005 | Ong |
| 2005/0256802 A1 | 11/2005 | Ammermann et al. |
| 2005/0269401 A1 | 12/2005 | Spitzer et al. |
| 2005/0269402 A1 | 12/2005 | Spitzer et al. |
| 2006/0163345 A1 | 7/2006 | Myers et al. |
| 2006/0190351 A1 | 8/2006 | Dennis |
| 2006/0235795 A1 | 10/2006 | Johnson et al. |
| 2006/0237528 A1 | 10/2006 | Bishop et al. |
| 2006/0278704 A1 | 12/2006 | Saunders et al. |
| 2007/0011099 A1 | 1/2007 | Sheehan |
| 2007/0022058 A1 | 1/2007 | Labrou et al. |
| 2007/0107044 A1 | 5/2007 | Yuen et al. |
| 2007/0108269 A1 | 5/2007 | Benco et al. |
| 2007/0124211 A1 | 5/2007 | Smith |
| 2007/0129955 A1 | 6/2007 | Dalmia et al. |
| 2007/0136193 A1 | 6/2007 | Starr |
| 2007/0136211 A1 | 6/2007 | Brown et al. |
| 2007/0170247 A1 | 7/2007 | Friedman |
| 2007/0179885 A1 | 8/2007 | Bird et al. |
| 2007/0208671 A1 | 9/2007 | Brown et al. |
| 2007/0245414 A1 | 10/2007 | Chan et al. |
| 2007/0266130 A1 | 11/2007 | Mazur et al. |
| 2007/0288377 A1 | 12/2007 | Shaked |
| 2007/0291995 A1 | 12/2007 | Rivera |
| 2008/0015988 A1 | 1/2008 | Brown et al. |
| 2008/0029607 A1 | 2/2008 | Mullen |
| 2008/0035738 A1 | 2/2008 | Mullen |
| 2008/0052226 A1 | 2/2008 | Agarwal et al. |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan et al. |
| 2008/0065555 A1 | 3/2008 | Mullen |
| 2008/0099552 A1 | 5/2008 | Grillion |
| 2008/0114699 A1 | 5/2008 | Yuan et al. |
| 2008/0201264 A1 | 8/2008 | Brown et al. |
| 2008/0201265 A1 | 8/2008 | Hewton |
| 2008/0228646 A1 | 9/2008 | Myers et al. |
| 2008/0243702 A1 | 10/2008 | Hart et al. |
| 2008/0245855 A1 | 10/2008 | Fein et al. |
| 2008/0245861 A1 | 10/2008 | Fein et al. |
| 2008/0283591 A1 | 11/2008 | Oder, II et al. |
| 2008/0301042 A1 | 12/2008 | Patzer |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown et al. |
| 2009/0010488 A1 | 1/2009 | Matsuoka et al. |
| 2009/0037333 A1 | 2/2009 | Flitcroft et al. |
| 2009/0037388 A1 | 2/2009 | Cooper et al. |
| 2009/0043702 A1 | 2/2009 | Bennett |
| 2009/0048971 A1 | 2/2009 | Hathaway et al. |
| 2009/0106112 A1 | 4/2009 | Dalmia et al. |
| 2009/0106160 A1 | 4/2009 | Skowronek |
| 2009/0134217 A1 | 5/2009 | Flitcroft et al. |
| 2009/0157555 A1 | 6/2009 | Biffle et al. |
| 2009/0159673 A1 | 6/2009 | Mullen et al. |
| 2009/0159700 A1 | 6/2009 | Mullen et al. |
| 2009/0159707 A1 | 6/2009 | Mullen et al. |
| 2009/0173782 A1 | 7/2009 | Muscato |
| 2009/0200371 A1 | 8/2009 | Kean et al. |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson et al. |
| 2009/0307139 A1 | 12/2009 | Mardikar et al. |
| 2009/0308921 A1 | 12/2009 | Mullen |
| 2009/0327131 A1 | 12/2009 | Beenau et al. |

(56) References Cited

U.S. PATENT DOCUMENTS

| | | |
|---|---|---|
| 2010/0008535 A1 | 1/2010 | Abulafia et al. |
| 2010/0088237 A1 | 4/2010 | Wankmueller |
| 2010/0094755 A1 | 4/2010 | Kloster |
| 2010/0106644 A1 | 4/2010 | Annan et al. |
| 2010/0120408 A1 | 5/2010 | Beenau et al. |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru et al. |
| 2010/0211505 A1 | 8/2010 | Saunders et al. |
| 2010/0223186 A1 | 9/2010 | Hogan et al. |
| 2010/0228668 A1 | 9/2010 | Hogan et al. |
| 2010/0235284 A1 | 9/2010 | Moore |
| 2010/0258620 A1 | 10/2010 | Torreyson et al. |
| 2010/0291904 A1 | 11/2010 | Musfeldt et al. |
| 2010/0299267 A1 | 11/2010 | Faith et al. |
| 2010/0306076 A1 | 12/2010 | Taveau et al. |
| 2010/0325041 A1 | 12/2010 | Berardi et al. |
| 2011/0010292 A1 | 1/2011 | Giordano et al. |
| 2011/0016047 A1 | 1/2011 | Wu et al. |
| 2011/0016320 A1 | 1/2011 | Bergsten et al. |
| 2011/0040640 A1 | 2/2011 | Erikson |
| 2011/0047076 A1 | 2/2011 | Carlson et al. |
| 2011/0083018 A1 | 4/2011 | Kesanupalli et al. |
| 2011/0087596 A1 | 4/2011 | Dorsey |
| 2011/0093397 A1 | 4/2011 | Carlson et al. |
| 2011/0125597 A1 | 5/2011 | Oder, II et al. |
| 2011/0153437 A1 | 6/2011 | Archer et al. |
| 2011/0153498 A1 | 6/2011 | Makhotin et al. |
| 2011/0154466 A1 | 6/2011 | Harper et al. |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park et al. |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen et al. |
| 2011/0276381 A1 | 11/2011 | Mullen et al. |
| 2011/0276424 A1 | 11/2011 | Mullen |
| 2011/0276425 A1 | 11/2011 | Mullen |
| 2011/0295745 A1 | 12/2011 | White et al. |
| 2011/0302081 A1 | 12/2011 | Saunders et al. |
| 2012/0018506 A1 | 1/2012 | Hammad et al. |
| 2012/0028609 A1 | 2/2012 | Hruska |
| 2012/0030047 A1 | 2/2012 | Fuentes et al. |
| 2012/0035998 A1 | 2/2012 | Chien et al. |
| 2012/0041881 A1 | 2/2012 | Basu et al. |
| 2012/0047237 A1 | 2/2012 | Arvidsson et al. |
| 2012/0066078 A1 | 3/2012 | Kingston et al. |
| 2012/0072350 A1 | 3/2012 | Goldthwaite et al. |
| 2012/0078735 A1 | 3/2012 | Bauer et al. |
| 2012/0078798 A1 | 3/2012 | Downing et al. |
| 2012/0078799 A1 | 3/2012 | Jackson et al. |
| 2012/0095852 A1 | 4/2012 | Bauer et al. |
| 2012/0095865 A1 | 4/2012 | Doherty et al. |
| 2012/0116902 A1 | 5/2012 | Cardina et al. |
| 2012/0123882 A1 | 5/2012 | Carlson et al. |
| 2012/0123940 A1 | 5/2012 | Killian et al. |
| 2012/0129514 A1 | 5/2012 | Beenau et al. |
| 2012/0143767 A1 | 6/2012 | Abadir |
| 2012/0143772 A1 | 6/2012 | Abadir |
| 2012/0158580 A1 | 6/2012 | Eram et al. |
| 2012/0158593 A1 | 6/2012 | Garfinkle et al. |
| 2012/0173431 A1 | 7/2012 | Ritchie et al. |
| 2012/0185386 A1 | 7/2012 | Salama et al. |
| 2012/0197807 A1 | 8/2012 | Schlesser et al. |
| 2012/0203664 A1 | 8/2012 | Torossian et al. |
| 2012/0203666 A1 | 8/2012 | Torossian et al. |
| 2012/0215688 A1 | 8/2012 | Musser et al. |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain et al. |
| 2012/0246079 A1 | 9/2012 | Wilson et al. |
| 2012/0265631 A1 | 10/2012 | Cronic et al. |
| 2012/0271770 A1 | 10/2012 | Harris et al. |
| 2012/0297446 A1 | 11/2012 | Webb et al. |
| 2012/0300932 A1 | 11/2012 | Cambridge et al. |
| 2012/0303503 A1 | 11/2012 | Cambridge et al. |
| 2012/0303961 A1 | 11/2012 | Kean et al. |
| 2012/0304273 A1 | 11/2012 | Bailey et al. |
| 2012/0310725 A1 | 12/2012 | Chien et al. |
| 2012/0310831 A1 | 12/2012 | Harris et al. |
| 2012/0316992 A1 | 12/2012 | Oborne |
| 2012/0317035 A1 | 12/2012 | Royyuru et al. |
| 2012/0317036 A1 | 12/2012 | Bower et al. |
| 2013/0017784 A1 | 1/2013 | Fisher |
| 2013/0018757 A1 | 1/2013 | Anderson et al. |
| 2013/0019098 A1 | 1/2013 | Gupta et al. |
| 2013/0031006 A1 | 1/2013 | McCullagh et al. |
| 2013/0048714 A1 | 2/2013 | Sharma et al. |
| 2013/0054337 A1 | 2/2013 | Brendell et al. |
| 2013/0054466 A1 | 2/2013 | Muscato |
| 2013/0054474 A1 | 2/2013 | Yeager |
| 2013/0081122 A1 | 3/2013 | Svigals et al. |
| 2013/0091028 A1 | 4/2013 | Oder, II et al. |
| 2013/0110658 A1 | 5/2013 | Lyman et al. |
| 2013/0111599 A1 | 5/2013 | Gargiulo |
| 2013/0117185 A1 | 5/2013 | Collison et al. |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith et al. |
| 2013/0145148 A1 | 6/2013 | Shablygin et al. |
| 2013/0145172 A1 | 6/2013 | Shablygin et al. |
| 2013/0159178 A1 | 6/2013 | Colon et al. |
| 2013/0159184 A1 | 6/2013 | Thaw |
| 2013/0166402 A1 | 6/2013 | Parento et al. |
| 2013/0166456 A1 | 6/2013 | Zhang et al. |
| 2013/0173736 A1 | 7/2013 | Krzeminski et al. |
| 2013/0185202 A1 | 7/2013 | Goldthwaite et al. |
| 2013/0191227 A1 | 7/2013 | Pasa et al. |
| 2013/0191286 A1 | 7/2013 | Cronic et al. |
| 2013/0191289 A1 | 7/2013 | Cronic et al. |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge et al. |
| 2013/0212007 A1 | 8/2013 | Mattsson et al. |
| 2013/0212017 A1 | 8/2013 | Bangia |
| 2013/0212019 A1 | 8/2013 | Mattsson et al. |
| 2013/0212024 A1 | 8/2013 | Mattsson et al. |
| 2013/0212026 A1 | 8/2013 | Powell et al. |
| 2013/0212666 A1 | 8/2013 | Mattsson et al. |
| 2013/0218698 A1 | 8/2013 | Moon et al. |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru et al. |
| 2013/0254102 A1 | 9/2013 | Royyuru |
| 2013/0254117 A1 | 9/2013 | von Mueller et al. |
| 2013/0262296 A1 | 10/2013 | Thomas et al. |
| 2013/0262302 A1 | 10/2013 | Lettow et al. |
| 2013/0262315 A1 | 10/2013 | Hruska |
| 2013/0262316 A1 | 10/2013 | Hruska |
| 2013/0262317 A1 | 10/2013 | Collinge et al. |
| 2013/0275300 A1 | 10/2013 | Killian et al. |

(56) References Cited

U.S. PATENT DOCUMENTS

| | | |
|---|---|---|
| 2013/0275307 A1 | 10/2013 | Khan |
| 2013/0275308 A1 | 10/2013 | Paraskeva et al. |
| 2013/0282502 A1 | 10/2013 | Jooste |
| 2013/0282575 A1 | 10/2013 | Mullen et al. |
| 2013/0282588 A1 | 10/2013 | Hruska |
| 2013/0297501 A1 | 11/2013 | Monk et al. |
| 2013/0297504 A1 | 11/2013 | Nwokolo et al. |
| 2013/0297508 A1 | 11/2013 | Belamant |
| 2013/0304649 A1 | 11/2013 | Cronic et al. |
| 2013/0308778 A1 | 11/2013 | Fosmark et al. |
| 2013/0311382 A1 | 11/2013 | Fosmark et al. |
| 2013/0317982 A1 | 11/2013 | Mengerink et al. |
| 2013/0332344 A1 | 12/2013 | Weber |
| 2013/0339253 A1 | 12/2013 | Sincai |
| 2013/0346305 A1 | 12/2013 | Mendes |
| 2013/0346314 A1 | 12/2013 | Mogollon et al. |
| 2014/0007213 A1 | 1/2014 | Sanin et al. |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson et al. |
| 2014/0040139 A1 | 2/2014 | Brudnicki et al. |
| 2014/0040144 A1 | 2/2014 | Plomske et al. |
| 2014/0040145 A1 | 2/2014 | Ozvat et al. |
| 2014/0040628 A1 | 2/2014 | Fort et al. |
| 2014/0041018 A1 | 2/2014 | Bomar et al. |
| 2014/0046853 A1 | 2/2014 | Spies et al. |
| 2014/0047551 A1 | 2/2014 | Nagasundaram et al. |
| 2014/0052532 A1 | 2/2014 | Tsai et al. |
| 2014/0052620 A1 | 2/2014 | Rogers et al. |
| 2014/0052637 A1 | 2/2014 | Jooste et al. |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0149293 A1 | 5/2014 | Laracey |
| 2014/0164243 A1 | 6/2014 | Aabye et al. |
| 2014/0188586 A1 | 7/2014 | Carpenter et al. |
| 2014/0294701 A1 | 10/2014 | Dai et al. |
| 2014/0310183 A1 | 10/2014 | Weber |
| 2014/0324690 A1 | 10/2014 | Allen et al. |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1* | 12/2014 | Sheets .................. G06Q 20/20 705/44 |
| 2015/0019443 A1 | 1/2015 | Sheets et al. |
| 2015/0032625 A1 | 1/2015 | Dill et al. |
| 2015/0032626 A1 | 1/2015 | Dill et al. |
| 2015/0032627 A1 | 1/2015 | Dill et al. |
| 2015/0046338 A1 | 2/2015 | Laxminarayanan et al. |
| 2015/0046339 A1 | 2/2015 | Wong et al. |
| 2015/0052064 A1 | 2/2015 | Karpenko et al. |
| 2015/0081544 A1 | 3/2015 | Schulz et al. |
| 2015/0088674 A1 | 3/2015 | Flurscheim et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0356560 A1 | 12/2015 | Shastry et al. |
| 2016/0012399 A1 | 1/2016 | Etchegoyen |
| 2016/0028550 A1 | 1/2016 | Gaddam et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0103675 A1 | 4/2016 | Aabye et al. |
| 2016/0119296 A1 | 4/2016 | Laxminarayanan et al. |
| 2016/0140545 A1 | 5/2016 | Flurscheim et al. |
| 2016/0148197 A1 | 5/2016 | Dimmick |
| 2016/0148212 A1 | 5/2016 | Dimmick |
| 2016/0171479 A1 | 6/2016 | Prakash et al. |
| 2016/0173483 A1 | 6/2016 | Wong et al. |
| 2016/0210628 A1 | 7/2016 | McGuire |
| 2016/0218875 A1 | 7/2016 | Le Saint et al. |
| 2016/0224977 A1 | 8/2016 | Sabba et al. |
| 2016/0232527 A1 | 8/2016 | Patterson |
| 2016/0239842 A1 | 8/2016 | Cash et al. |
| 2017/0163617 A1* | 6/2017 | Laxminarayanan ........................ G06Q 20/4018 |
| 2017/0221054 A1 | 8/2017 | Flurscheim et al. |

FOREIGN PATENT DOCUMENTS

| | | |
|---|---|---|
| WO | 0135304 A1 | 5/2001 |
| WO | 0157770 A1 | 8/2001 |
| WO | 0135304 A9 | 5/2002 |
| WO | 2004042536 A2 | 5/2004 |
| WO | 2006000002 A2 | 1/2006 |
| WO | 2006000021 A1 | 1/2006 |
| WO | 2006002251 A2 | 1/2006 |
| WO | 2006063628 A1 | 6/2006 |
| WO | 2006113834 A2 | 10/2006 |
| WO | 2008045007 A2 | 4/2008 |
| WO | 2009032523 A1 | 3/2009 |
| WO | 2009055719 A2 | 4/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |
| WO | 2015013548 A1 | 1/2015 |
| WO | 2015105688 A1 | 7/2015 |
| WO | 2017136418 A1 | 8/2017 |

OTHER PUBLICATIONS

""Smile, please"one click, payment completed", Fun communications GmbH Press Release, Mar. 2004, 2 pages.
"Cingular, Citybank and Nokia Testing Credit Card Mobile Phone, Softpedia", Softpedia, 1 page.
"Citigroup, Mastercard, Cingular and Nokia team to pilot next generation mobile phone with "tap & go™" payment in New York City", Nokia Press Release, Dec. 14, 2006, 2 pages.
"Fun Communications Develops "Photopay"", Mobile Payments World, 2002-2014, 1 page.
"Mobipay Case Study, The Payment system via the Mobile", 5 pages.
"Mobipay makes Spain world leader in the development of the payments via mobile phones", Telefonica Press Release, 6 pages.
"TeleTalk Best of CeBIT Award 2004 for fun communications", Fun communications GmbH Press Release, Mar. 2004, 2 pages.

(56) References Cited

OTHER PUBLICATIONS

"Thirsty? Then Dial a Drink, internetnews.com", Apr. 5, 2001, 1 page.
"What People are Saying about Ordering through Salt", Available online at: www.saltmobile.com,, 4 pages.
U.S. Appl. No. 15/421,891, Advisory Action, dated Feb. 20, 2020, 5 pages.
U.S. Appl. No. 15/421,891, Final Office Action, dated Aug. 11, 2020, 10 pages.
U.S. Appl. No. 15/421,891, Final Office Action, dated Oct. 31, 2019, 37 pages.
U.S. Appl. No. 15/421,891, Non-Final Office Action, dated Apr. 24, 2019, 31 pages.
U.S. Appl. No. 15/421,891, Non-Final Office Action, dated Apr. 2, 2020, 9 pages.
U.S. Appl. No. 15/421,891, Notice of Allowance, dated Mar. 18, 2021, 11 pages.
U.S. Appl. No. 61/738,832, Management of Sensitive Data, filed Dec. 18, 2012, 22 pages.
U.S. Appl. No. 61/751,763, Payments Bridge, filed Jan. 11, 2013, 64 pages.
U.S. Appl. No. 61/892,407, Issuer Over-The-Air Update Method and System, filed Oct. 17, 2013, 28 pages.
U.S. Appl. No. 61/894,749, Methods and Systems for Authentication and Issuance of Tokens in a Secure Environment, filed Oct. 23, 2013, 67 pages.
U.S. Appl. No. 61/926,236, Methods and Systems for Provisioning Mobile Devices With Payment Credentials and Payment Token Identifiers, filed Jan. 10, 2014, 51 pages.
U.S. Appl. No. 62/000,288, Payment System Canonical Address Format, filed May 19, 2014, 58 pages.
U.S. Appl. No. 62/003,717, Mobile Merchant Application, filed May 28, 2014, 58 pages.
U.S. Appl. No. 62/024,426, Secure Transactions Using Mobile Devices, filed Jul. 14, 2014, 102 pages.
U.S. Appl. No. 62/037,033, Sharing Payment Token, filed Aug. 13, 2014, 36 pages.
U.S. Appl. No. 62/038,174, Customized Payment Gateway, filed Aug. 15, 2014, 42 pages.
U.S. Appl. No. 62/042,050, Payment Device Authentication and Authorization System, filed Aug. 26, 2014, 120 pages.
U.S. Appl. No. 62/053,736, Completing Transactions Without a User Payment Device, filed Sep. 22, 2014, 31 pages.
U.S. Appl. No. 62/054,346, Mirrored Token Vault, filed Sep. 23, 2014, 38 pages.
U.S. Appl. No. 62/103,522, Methods and Systems for Wallet Provider Provisioning, filed Jan. 14, 2015, 39 pages.
U.S. Appl. No. 62/108,403, Wearables With NFC HCE, filed Jan. 27, 2015, 32 pages.
U.S. Appl. No. 62/117,291, Token and Cryptogram Using Transaction Specific Information, filed Feb. 17, 2015, 25 pages.
U.S. Appl. No. 62/128,709, filed Tokenizing Transaction Amounts, filed Mar. 5, 2015, 30 pages.
AU2008316613, "Statement of Grounds and Particulars by Eftpos Payments Australia Limited", Aug. 13, 2014, 21 pages.
CN201780008623.5, Office Action, dated Jan. 25, 2021, 20 pages.
CONABREE, "Telstra Mobile m-Commerce", Aug. 13, 2002, 1 page.
EP17748060.5, Extended European Search Report, dated Oct. 26, 2018, 8 pages.
EP17748060.5, Office Action, dated Apr. 6, 2021, 7 pages.
Gao et al., "Emerging Technologies for Mobile Commerce", Journal of Theoretical and Applied Electronic Commerce Research, vol. 1, Issue 2, Aug. 2006, 5 pages.
Hughes et al., "M-PESA: Mobile Money for the "unbanked" Turning Cellphones into 24-Hour Tellers in Kenya", innovations, winters spring, 2007, 19 pages.
Karnouskos et al., "SeMoPS: A Global Secure Mobile Payment Service", Available online at: http://www.idea-group.com, innovations/winter and spring 2007,, 2007, pp. 237-261.
Luo et al., "Enabling Technology and Functionalities of Shopping Portals", Idea Group Inc., 2007, 2 pages.
PCT/US2017/016009, International Preliminary Report on Patentability, dated Aug. 16, 2018, 11 pages.
PCT/US2017/016009, International Search Report and Written Opinion, dated Apr. 25, 2017, 12 pages.
SEMOPS, "SEMOPS Internet Payments", 2 pages.
SEMOPS, "Semops Mobile Commerce", 2 pages.
SEMOPS, "SEMOPS Point of Sale Transactions", 2 pages.
Uden, "The Next Generation Electronic Payment Service, Internet + Mobile", SEMOPS, Secure Mobile Payment Service, Deloitte, info@semops.com,, 18 pages.
Application No. CN201780008623.5, Office Action, dated Sep. 29, 2021, 18 pages.
IN201847031951, First Examination Report, dated Jul. 29, 2021, 6 pages.
Application No. CN201780008623.5, Notice of Decision to Grant, dated Apr. 24, 2022, 6 pages.

\* cited by examiner

US 11,720,893 B2

SYSTEMS AND METHODS FOR CODE DISPLAY AND USE

CROSS-REFERENCES TO RELATED APPLICATIONS

This application is Continuation Application of U.S. application Ser. No. 15/421,891, filed Feb. 1, 2017, which claims the benefit of U.S. Provisional Patent Application No. 62/289,695, filed Feb. 1, 2016, entitled "TRANSACTION SYSTEMS AND METHODS FOR MERCHANT CODE DISPLAY AND USE", and are hereby incorporated by reference in their entirety.

BACKGROUND

A transaction is typically authorized by a user at the time the transaction is requested from a resource provider. For example, a cardholder may authorize a purchase at a point of sale. The user's sensitive information, such as a primary account number (PAN), access number, or PIN number, may be communicated by a device utilized to conduct the transaction (e.g., a credit card, a mobile device, a communication device, a security device, etc.). However, users may not want to share their sensitive information with resource providers due to security concerns.

Therefore, a secure and efficient method is needed to provide more users with the capability to conduct transactions using their devices, while keeping their sensitive information hidden from resource providers. This may reduce risk both of fraud by the resource provider, as well as interception and misuse of the sensitive information by reducing the number of parties to which the sensitive information is communicated. Embodiments of the invention address this and other problems, individually and collectively.

SUMMARY

According to some embodiments of the invention, systems and methods are provided that allow consumers to use their communication devices to perform transactions, without requiring the use of a contactless element or specialized hardware at the resource provider. To complete a transaction, a resource provider may electronically generate a code representing transaction data (e.g., resource provider data, location data, transaction amount, etc.) and display it on an access device, for example. The code may be, for example, a QR code. A user may scan the code with his or her communication device using a camera associated with the communication device, for example. The code may be interpreted by an application on the communication device and the transaction data may be displayed to the user in one embodiment. The user may request and receive a token at the communication device corresponding to sensitive information selected to perform the transaction. The user may then provide the token and the transaction data via the communication device to an application provider computer, which may facilitate completion of the transaction between the user and the resource provider using the transaction data and the token, as described further herein.

According some embodiments of the invention, a method of performing a transaction between a user and a resource provider is provided. The method comprises scanning, at a communication device of the user, a code displayed by an access device associated with the resource provider. The method further comprises determining, by the communication device, transaction data associated with the code. The method further comprises initiating, by the communication device, requesting a token corresponding to sensitive information of the user by providing the transaction data to a server computer to complete the transaction. In embodiments of the invention, "initiating requesting" may include requesting, by the communication device, the token (or other data). It may also include sending, by the communication device, a communication to another computer such as a remote server computer, which causes the remote server computer to request the token (or other data).

Embodiments of the invention are further directed to a communication device comprising a processor and a memory or computer-readable medium. The memory can comprise code, executable by the processor, for implementing the above method described herein.

According to some embodiments of the invention, a method is provided. The method comprises receiving, by an application provider computer, transaction data from a communication device. The transaction data was obtained by the communication device from an access device in a transaction. The method further comprises transmitting, by the application provider computer, a token request for a token to a token server. The method further comprises receiving, by the application provider computer, the token. The token is used to complete the transaction.

According to some embodiments of the invention, a method of performing a transaction between a user and a resource provider is provided. According to the method, transaction data comprising a transaction type indicator is received from a communication device, wherein at least some of the transaction data is received from an access device. The transaction data is analyzed, and it is determined that the transaction type indicator is one of a plurality of transaction type indicators associated with a plurality of different transaction types. Transaction processing is then initiated according to the transaction type indicator.

Embodiments of the invention are further directed to a server computer comprising a processor and a non-transitory computer readable medium. The computer readable medium can comprise code, executable by the processor, for implementing any of the methods described herein.

These and other embodiments of the invention are described in further detail below.

DETAILED DESCRIPTION

Figure 1A:
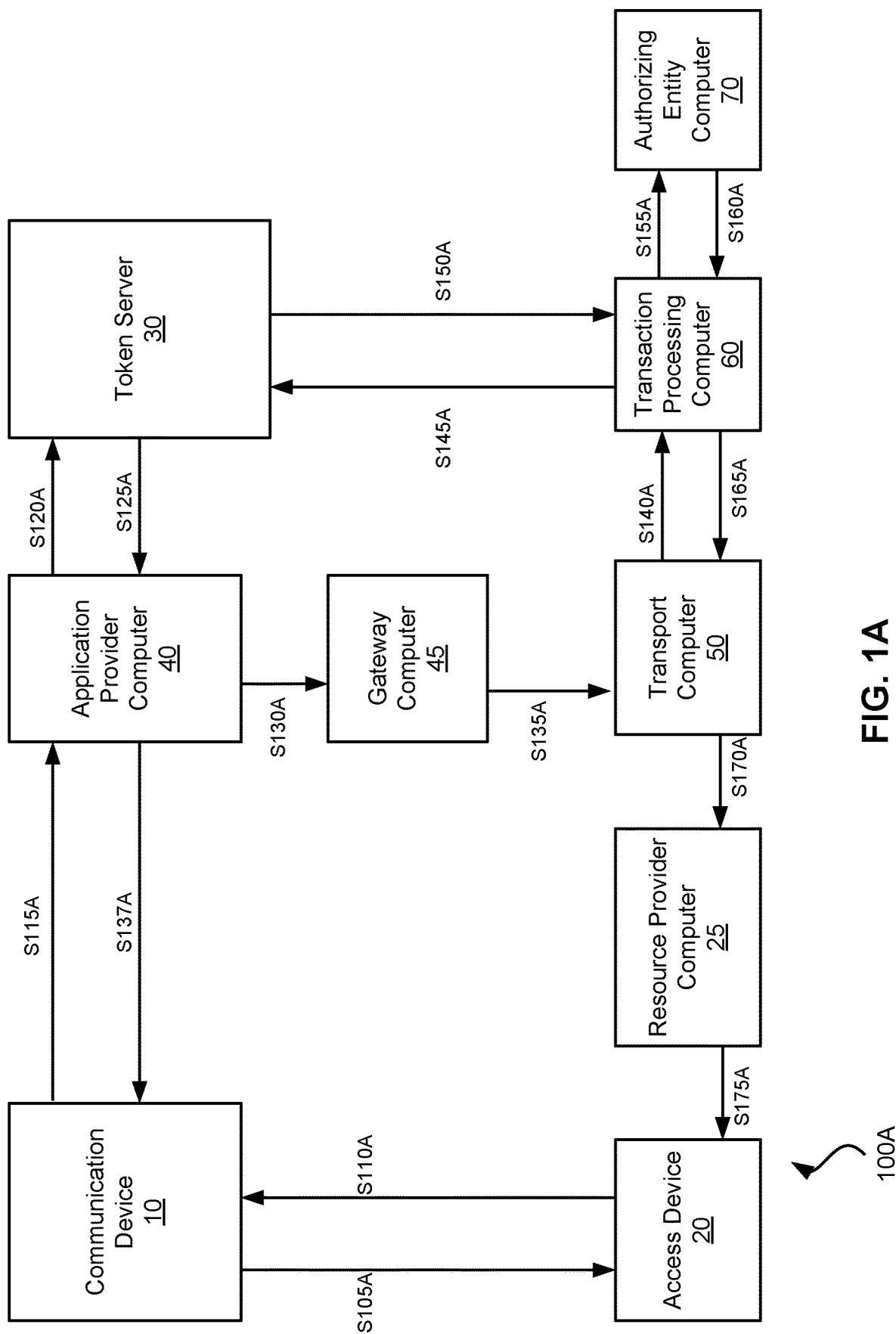
FIG. 1A shows a block diagram of a system and method for display and use of a generic code in a transaction initiated by a communication device according to some embodiments of the present invention.

Embodiments of the present invention relate to systems and methods that allow users to use their communication devices to perform transactions (e.g., payment transactions, access transactions, etc.). To complete a transaction, a resource provider electronically generates a code representing transaction data and displays it on an access device. The user scans the code with his or her communication device using a camera associated with the communication device, for example. The code is interpreted by an application on the communication device. The user may request and receive a token at the communication device corresponding to sensitive information selected to perform the transaction (e.g., a primary account number). The user may then provide the token and the transaction data via the communication device to a server computer, which may facilitate completion of the transaction between the user and the resource provider using the transaction data and the token, as described further herein.

Before discussing specific embodiments and examples, some descriptions of terms used herein are provided below.

An "access device" may be any suitable device that provides access to a remote system. An access device may also be used for communicating with a resource provider computer, a transaction processing computer, an authentication computer, or any other suitable system. An access device may generally be located in any suitable location, such as at the location of a resource provider or merchant. An access device may be in any suitable form. Some examples of access devices include POS or point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, terminals, and the like. An access device may use any suitable contact or contactless mode of operation to send or receive data from, or associated with, a user communication device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. Other examples of access devices include devices (e.g., locks, gates, access control boxes, etc.) that control physical access to locations (e.g., venues, transit stations, homes, offices, buildings, etc.), as well as software devices that control access to data or information.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorization request message" may be an electronic message that is sent to a payment processing network and/or an issuer of a payment card to request authorization for a transaction. An authorization request message according to some embodiments may comply with (International Organization of Standardization) ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. . . . An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

An "authorizing entity" may be an entity that authorizes a request. Examples of an authorizing entity may be an issuer, a governmental agency, a document repository, an access administrator, etc.

A "code" may be any system of words, letters, numbers, figures, and/or other symbols substituted for data. Exemplary codes include barcodes, QR codes, SKUs, etc.

A "communication device" may comprise any suitable electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of communication devices include mobile phones (e.g., cellular phones), PDAs, tablet computers, net books, laptop computers, personal music players, handheld specialized readers, watches, fitness bands, ankle bracelets, rings, earrings, etc., as well as automobiles with remote communication capabilities. A communication device may comprise any suitable hardware and software for performing such functions, and may also include multiple devices or components (e.g., when a device has remote access to a network by tethering to another device—i.e., using the other device as a modem—both devices taken together may be considered a single communication device).

A "consumer" may include an individual or a user that operates a communication device to conduct a transaction on an account or otherwise manage an account.

A "digital wallet" can include an electronic application or device that allows an individual to conduct electronic commerce transactions. A digital wallet may store user profile information, payment credentials, bank account information, one or more digital wallet identifiers, and/or the like, and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites or systems, transferring funds between users, and/or the like. A digital wallet may be designed to streamline the purchase and payment process. A digital wallet may allow the user to load one or more payment cards onto the digital wallet so as to make a payment without having to enter an account number or present a physical card. A digital wallet may also store transaction records (e.g., electronic receipts).

An "issuer" may typically refer to a business entity (e.g., a bank) that maintains an account for a user. An issuer may also issue payment credentials stored on communication devices.

"Provisioning" may include a process of providing data for use. For example, provisioning may include providing, delivering, or enabling a token on a communication device. Provisioning may be completed by any entity within or external to the transaction system. For example, in some embodiments, tokens may be provisioned by an issuer or a transaction processing network onto a mobile device. The provisioned tokens may have corresponding token data stored and maintained in a token vault or token registry. In some embodiments, a token vault or token registry may generate a token that may then be provisioned or delivered to a device.

A "resource provider" may be an entity that can provide a resource such as goods, services, information, and/or access. Examples of a resource provider include merchants, access devices, secure data access points, etc. A "merchant" may typically be an entity that engages in transactions and can sell goods or services, or provide access to goods or services.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "service provider" or "application provider" may be an entity that can provide a service or application. An example of a service provider is a digital wallet provider.

A "token" may include a substitute identifier for some information. For example, a payment token may include an identifier for a payment account that is a substitute for an account identifier, such as a primary account number (PAN). For instance, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle or resolve a payment transaction. The token may also be used to represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which sensitive data is replaced with substitute data. For example, a real account identifier (e.g., a primary account number (PAN)) may be tokenized by replacing the real account identifier with a substitute number that may be associated with the real account identifier. Further, tokenization can be applied to any other information to substitute the underlying information with a token. "Token exchange" or "de-tokenization" is a process of restoring the data that was substituted during tokenization. For example, a token exchange may include replacing a payment token with its associated primary account number (PAN). Further, de-tokenization or token exchange may be applied to any other information to retrieve the substituted information from a token. In some embodiments, token exchange can be achieved via a transactional message, such as an ISO message, an application programming interface (API), or another type of web interface (e.g., web request).

"Transaction data" may comprise any data associated with or indicative of a transaction between a resource provider (e.g., a merchant) and a user (e.g., a consumer). For example, transaction data may include resource provider data (e.g., resource provider ID, card acceptor ID, etc.), user data location data, transaction details (e.g., transaction ID, transaction amount, etc.).

A "transaction processing computer" may include a network of one or more devices that can process and route transaction request messages. An exemplary transaction processing computer may include data processing subsystems, networks, and operations used to support and deliver authorization services, exception file services, transaction scoring services, and clearing and settlement services. An exemplary transaction processing system may include VisaNet™. Transaction processing systems such as VisaNet™ are able to process credit card transactions, debit card transactions, and other types of commercial transactions. VisaNet™, in particular, may include a VIP system (Visa Integrated Payments system) which processes authorization requests and a Base II system which performs clearing and settlement services.

FIG. 1A shows a block diagram of a system and method 100A for display and use of a generic code in a transaction initiated by a communication device 10 according to some embodiments of the present invention. At step S105A, a user of a communication device 10 opens an application to use the communication device 10 to scan a code at an access device 20 during a transaction with a resource provider. The resource provider may operate both the resource provider computer 25 and the access device 20.

The code may be received by the communication device 10 from the access device 20 at step S110A. The code may have been previously generated by access device 20 or may have been generated in real time by access device 20. The code may be static (i.e., the same for multiple transactions) or dynamic (i.e., different for different transactions). The code may be displayed electronically by the access device 20, or may be printed on a piece of paper or otherwise displayed in a non-electronic fashion to the communication device 10. The communication device 10 may scan the code using a camera or any other visual detection device incorporated into or associated with the communication device 10, for example. In other embodiments, the code may be data that is transmitted wirelessly (e.g., through NFC, Bluetooth, infrared, etc.) from the access device 20 to the communication device 10.

The code may encode transaction data, including resource provider data such as a resource provider identifier and card acceptor identifier, location data associated with the access device 20 and/or the resource provider computer 25, transaction details such as a transaction amount, an identifier associated with the transport computer 50, an application identifier (AID), combinations thereof, and/or the like. In some embodiments, some of this transaction data, such as the transaction amount, may be omitted, as described further herein. In some embodiments, the code may be a QR code, a barcode, or any other code that may be used to represent data. In the embodiment shown in FIG. 1A, the code may be standardized across different transaction processing computers 60 (i.e., the code may be the same regardless of the transaction processor associated with the transaction).

The code may be interpreted (or decoded) by communication device 10 (e.g., through an application) to extract the underlying transaction data. In some embodiments, the communication device 10 may display the transaction data upon interpreting (or decoding) the code. In some embodiments, the communication device 10 may allow the user to confirm the transaction data upon interpreting the code.

In some embodiments, a transaction amount (e.g., a purchase amount, an amount of access to provide, what to provide access to, etc.) may not be provided in the code. Thus, a transaction amount may not be included in the transaction data extracted from the code. In these embodiments, the user may enter the transaction amount into the communication device 10 after scanning the code.

In some embodiments, the communication device 10 may display a list of sensitive information that may be used to complete the transactions (e.g., a list of primary account numbers (PANs), payment devices, passwords, PINs, etc.), and allow the user to select one or more pieces of sensitive information from the list. The communication device 10 may also generate, request or retrieve a token reference identifier corresponding to the sensitive information. A mapping between the token reference identifier and a token representing the sensitive information may be stored by the token server 30, as described further herein.

At step S115A, the communication device 10 may initiate the transaction and also initiated a request for a token by transmitting the transaction data, including the transaction amount and the token reference identifier, to an application provider computer 40. At step S120A, the application provider computer 40 may send the token reference identifier to the token server 30 to request the token corresponding to the token reference identifier, as well as to request a verification value associated with the sensitive information (e.g., a card verification number (CVN) associated with a selected payment device). At step S125A, the token server 30 may return the token (including any accompanying data) and the verification value to the application provider computer 40.

The application provider computer 40 may generate a unique transaction identifier (e.g., a UUID) corresponding to the transaction. At step S130A, the application provider computer 40 may transmit the token, transaction amount, transaction identifier, and/or other transaction data to a gateway computer 45. At step S137A, the application provider computer 40 may transmit the transaction identifier to the communication device 10 for display to the user.

At step S135A, the gateway computer 45 determines the proper transport computer 50 from the transaction data (e.g., through an identifier associated with the transport computer 50), and routes the token, transaction amount, transaction identifier, and/or other transaction data to the transport computer 50. The transport computer 50 may be, for example, an acquirer associated with the resource provider computer 25. At step S140A, the transport computer 50 may generate an authorization request message using the token data, the verification value, the transaction amount, and/or other transaction data, and route the authorization request message to the transaction processing computer 60.

At step S145A, the transaction processing computer 60 may transmit the token and any other token-related data to the token server 30. The token server 30 may identify the sensitive information associated with the token (e.g., through a mapping or look-up table, by applying an algorithm to the token, and/or through any other means). At step S150A, the token server 30 may return the sensitive information to the transaction processing computer 60 to process the transaction using the sensitive information.

The transaction processing computer 60 may modify the authorization request message to include the sensitive information (e.g., a PAN) instead of the token, and transmit the modified authorization request message to the authorizing entity computer 70. The authorizing entity computer 70 may determine whether to authorize or decline the transaction. For example, the authorizing entity computer 70 may determine whether the sensitive information is correct, whether the verification value is correct, whether the user is authorized to use the sensitive information, whether the transaction amount is available (e.g., whether there are sufficient funds for a payment transaction, whether the requested amount of access is authorized, etc.), combinations thereof, and/or the like.

At step S160A, the authorizing entity computer 70 returns its authorization decision via an authorization response message to the transaction processing computer 60. The authorization response message may include the sensitive information; thus, the transaction processing computer 60 may replace the sensitive information with the token in the authorization response message. At step S165A, the transaction processing computer 60 may route the modified authorization response message to the transport computer 50.

The transport computer 50 may extract the resource provider identifier from the authorization response message, then route the authorization response message to the appropriate resource provider computer 25 at step S170A. The resource provider computer 25 may provide at least the authorization decision and the transaction identifier to the access device 20. The access device 20 may match the transaction identifier received at step S175A to the transaction identifier received by the communication device 10 at step S137A in order to determine whether to complete the transaction with the communication device 10. In some embodiments, the user of the communication device 10 may then be provided with a receipt or other proof of completion of the transaction. A clearing and settlement process may occur at the end of the day or at any other suitable time after completion of the transaction.

In some embodiments, the transaction processing computer 60 is not needed and the token server 30 and the transport computer 50 may communicate directly with the authorizing entity computer 70.

Figure 1B:
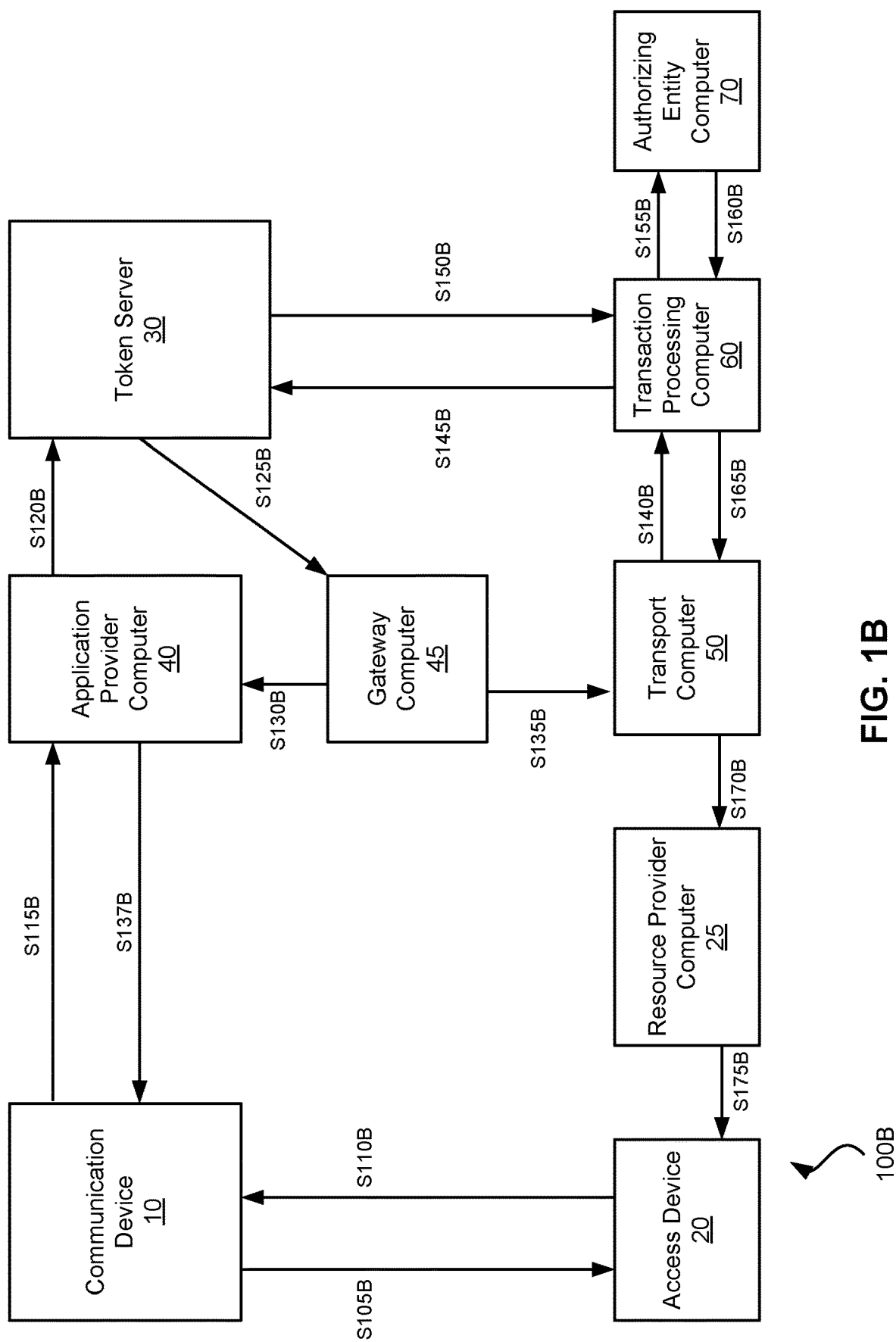
FIG. 1B shows a block diagram of a system and method for display and use of a transaction processor-specific code in a transaction initiated by a communication device according to some embodiments of the present invention.

FIG. 1B shows a block diagram of a system and method 100B for display and use of a transaction processor-specific code in a transaction initiated by a communication device 10 according to some embodiments of the present invention. Steps S105B-S115B may be as described above with respect to steps S105A-S115A of FIG. 1A. However, in the embodiment shown in FIG. 1B, the code may be unique to transaction processing computer 60 (i.e., the code is different based on the transaction processor associated with the transaction).

At step S120B, the application provider computer 40 may send the token reference identifier and the transaction data to the token server 30, as well as request a verification value associated with the sensitive information (e.g., a CVN associated with a selected payment device). At step S125B, the token server 30 may transmit the token (including any accompanying data), the verification value, and the transaction data directly to the gateway computer 45, without passing through the application provider computer 40.

At step S130B, gateway computer 45 sends a notification to application provider computer 40 that the token and any accompanying data was received from the token server 30, and that the transaction will continue processing. The application provider computer 40 may generate a unique transaction identifier (e.g., a UUID) corresponding to the transaction. At step S137B, the application provider computer 40 may transmit the transaction identifier to the communication device 10 for display to the user. Steps 135B to 175B may continue as described above with respect to steps 135A to 175A of FIG. 1A.

Figure 2:
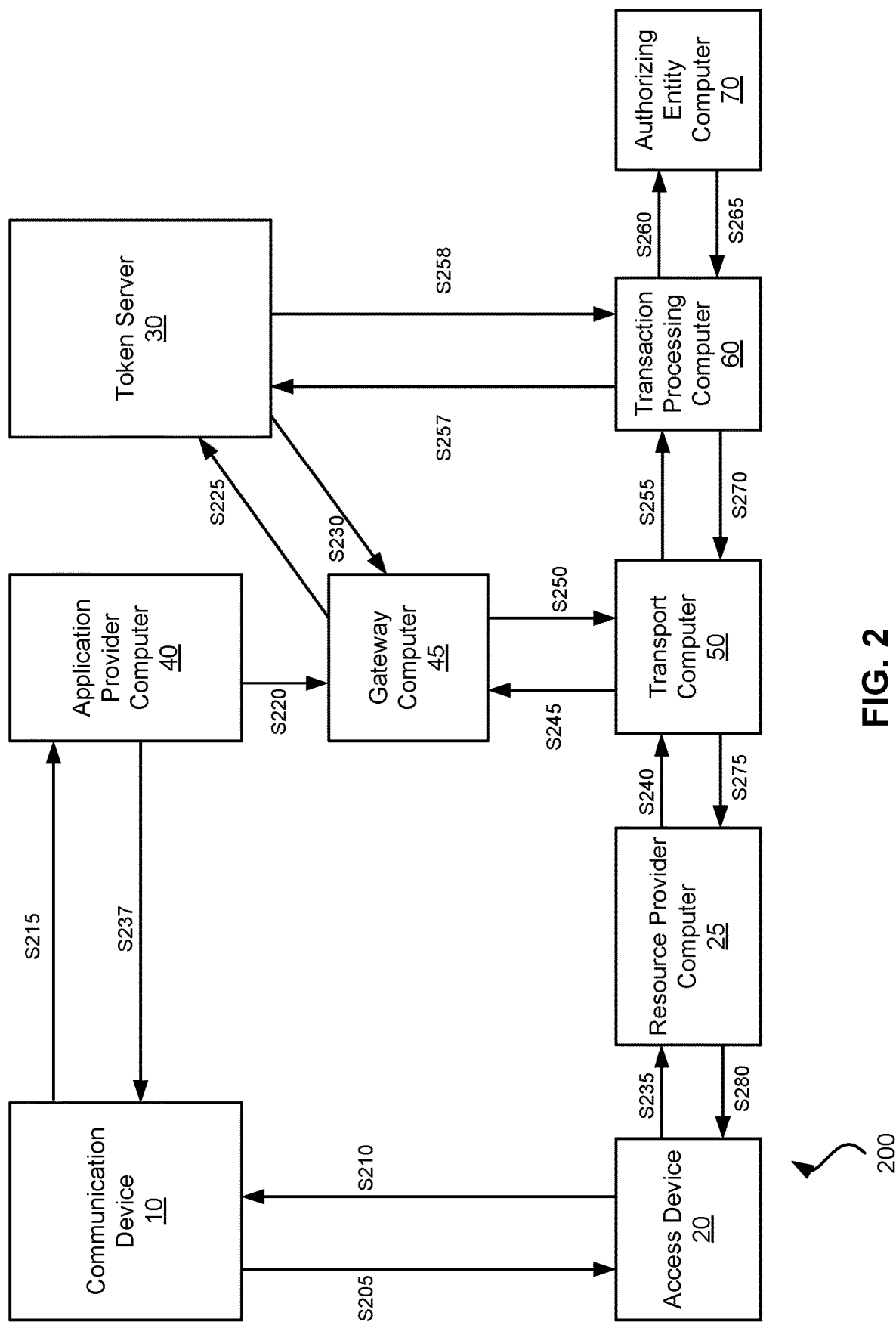
FIG. 2 shows a block diagram of a system and method for display and use of a code in a transaction initiated by an access device according to some embodiments of the present invention.

FIG. 2 shows a block diagram of a system and method 200 for display and use of a code in a transaction initiated by an access device 20 according to some embodiments of the present invention. At step S205, a user of communication device 10 may select a tender type at the access device 20. The access device 20 may generate the transaction identifier. The access device 20 may further generate a code with the transaction data, including the transaction identifier.

At step S210, the user of the communication device 10 may open an application to use the communication device 10 to scan the code. The code may be interpreted (or decoded) by communication device 10 (e.g., through an application) to extract the underlying transaction data. The communication device 10 may display a list of sensitive information that may be used to complete the transactions (e.g., a list of primary account numbers (PANs), payment devices, passwords, PINs, etc.), and allow the user to select one or more pieces of sensitive information from the list. The communication device 10 may generate, request or retrieve a token reference identifier corresponding to the sensitive information. A mapping between the token reference identifier and a token representing the sensitive information may be stored by the token server 30, as described further herein.

At step S215, the communication device 10 may transmit the transaction data, including the token reference identifier, to an application provider computer 40. At step S220, the application provider computer 40 sends the token reference identifier and transaction data (including the transaction identifier) to the gateway computer 45. The application provider computer 40 may know the proper gateway computer 45 to which to route the token reference identifier from one or more elements of the transaction data.

At step S225, the gateway computer 45 may send the token reference identifier to the token server 30 to request the token corresponding to the token reference identifier, as well as to request a verification value associated with the sensitive information (e.g., a card verification number (CVN) associated with a selected payment device). At step S230, the token server 30 may return the token (including any accompanying data) and the verification value to the gateway computer 45. In the embodiment of FIG. 2, the application provider computer 40 and the token server 30 may not communicate directly, but may do so via the gateway computer 45.

Before, after, or in parallel with steps S215-S230, at step S235, the access device 20 may generate an authorization request message for the transaction using the transaction data (including the transaction identifier) and a "dummy token", and forward the authorization request message to the resource provider computer 25. The "dummy token" may be formatted like a token and/or as a normal PAN, but does not contain sensitive information. In other words, the "dummy token" may be used in the authorization request message as a placeholder in order for the authorization to be processed as described herein, without using a real token. At step S240, the resource provider computer 25 may forward the authorization request message to the transport computer 50.

The transport computer 50 may transmit the authorization request message (or transaction data from the authorization request message) to the gateway computer 45 at step S245. The gateway computer 45 may match the transaction data received from the transport computer 50 to the transaction data received at step S220, as well as to the token and verification value received at step S230 (e.g., using the transaction identifier). At step S250, the gateway computer 45 may send the token and verification value (and any accompanying token data) to the transport computer 50.

The transport computer 50 may modify the authorization request message to include the token and verification value instead of the "dummy token". Steps S255 to S280 may proceed as described with respect to steps S140A to S175A of FIG. 1A.

The embodiments shown and described with respect to FIG. 2 have advantages. Because a token reference identifier is used to request a token, no information (e.g., a token or PAN) that can be used to conduct a payment transaction is stored on the communication device 10.

Figure 3:
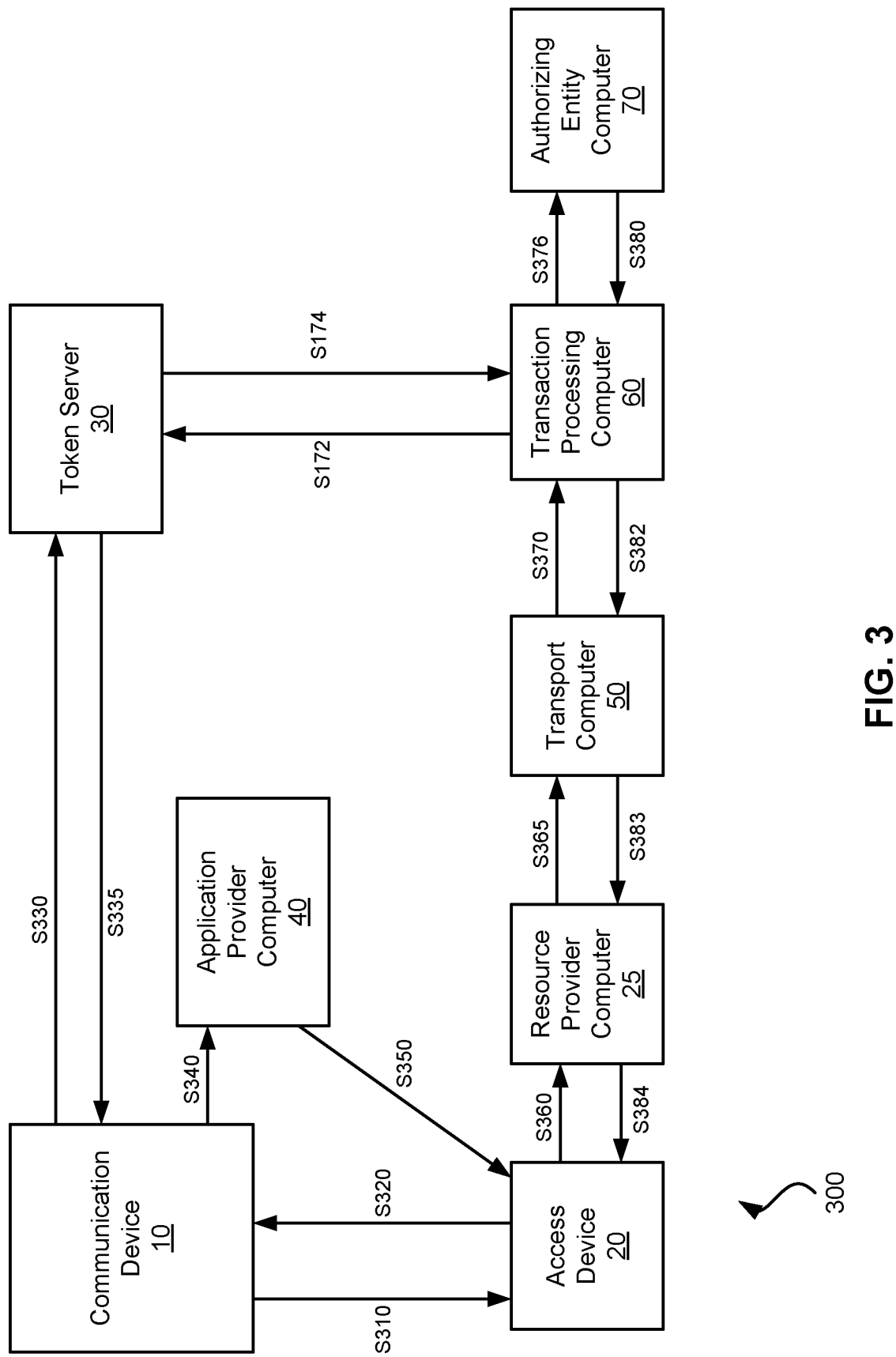
FIG. 3 shows a block diagram of a system and method for display and use of a code in a transaction using a card verification number (CVN) according to some embodiments of the present invention.

FIG. 3 shows a block diagram of a system and method 300 for display and use of a code in a transaction using a card verification number (CVN) according to some embodiments of the present invention. Steps S310 and S320 may be as described above with respect to steps S105A and S110A of FIG. 1A.

The transaction data may further include a transaction type, such as a flag or indicator indicating how the transaction will be processed (e.g., whether to use a card verification number (CVN), a TAVV, an original credit transaction (OCT), etc.). The transaction data may be analyzed to determine that the transaction type indicator is one of a plurality of transaction type indicators associated with a plurality of different transaction types. Transaction processing may be initiated according to the transaction type indicator. In this embodiment, the transaction type indicator indicates that a CVN transaction will be used in the transaction.

In the embodiment of FIG. 3 as well as the other embodiments described herein, the transaction type may be determined by which type(s) are capable of being processed by the particular resource provider and/or the transport computer 50. In one example, the transaction type may be determined by accessing a directory or listing of resource providers and/or transport computers 50 and the associated transaction type(s) for which they are enrolled. The transaction type may indicate the parties involved and the sequence of steps to be taken to process the transaction. However, this information may remain transparent to the user (e.g., the consumer), so that the user experience remains the same regardless of the transaction type.

At step S330, the application on the communication device 10 may communicate with a token server 30 to request a token and a CVN associated with sensitive information selected by the user to perform the transaction. At step S335, the token server 30 may provision the token and CVN to the communication device 10. At step S340, the application on the communication device 10 may encrypt the transaction data, as well as the token and CVN, and provide it to an application provider computer 40. The application provider computer 40 may be the provider of the application on the communication device, such as a digital wallet provider.

At step S350, the application provider computer 40 may decrypt the encrypted transaction data and the token and CVN, and may then validate the transaction data (e.g., checking to see that the location of the merchant is one that would be expected). After validation, it may re-encrypt the transaction data, the token, and the CVN and route the encrypted data for the transaction (including the token and the CVN) to the access device 20, which may decrypt the data upon receipt. In some embodiments, the communication device 10 and the application provider computer 40 may share one pair of encryption keys (e.g., symmetric encryption keys), while the application provider computer 40 and the access device 20 may share another pair of encryption keys (e.g., a different pair of symmetric encryption keys).

Authorization processes may be conducted, after the transaction data including the token and the CVN are received by the access device 20. For example, at step S360, the access device 20 may construct an authorization request message with the token, CVN, transaction amount, and any other suitable authorization data and submit it to a resource provider computer 25. At step S365, the resource provider computer 25 may transmit the authorization request message to a transport computer 50 (e.g., an acquirer). At step S370, the transport computer 50 may forward the authorization request message to a transaction processing computer 60. At step S372, the transaction processing computer 60 may request the sensitive information (e.g., PAN) associated with the token (i.e., detokenization) from the token server 30, and receive the sensitive information at step S374. At step S376, the transaction processing computer 60 may replace the token with the sensitive information in the authorization request message, and forward the authorization request message to an authorizing entity computer 70 (e.g., an issuer) for authorization.

At step S380, the authorizing entity computer 70 may send an authorization response message (i.e., denying or allowing the transaction based on available funds, proper CVN, etc.) to the transaction processing computer 60, which may forward the authorization response message to the transport computer 50 at step S382. The transport computer 50 may forward the authorization response message to the resource provider computer 25 at step S383. The resource provider computer 25 may forward the authorization response message (or some indication of authorization) to the access device at step S384. In one embodiment, the user of the communication device 10 may then be provided with a receipt or other proof of completion of the transaction. A clearing and settlement process may occur at the end of the day or at any other suitable time after completion of the transaction.

Figure 4:
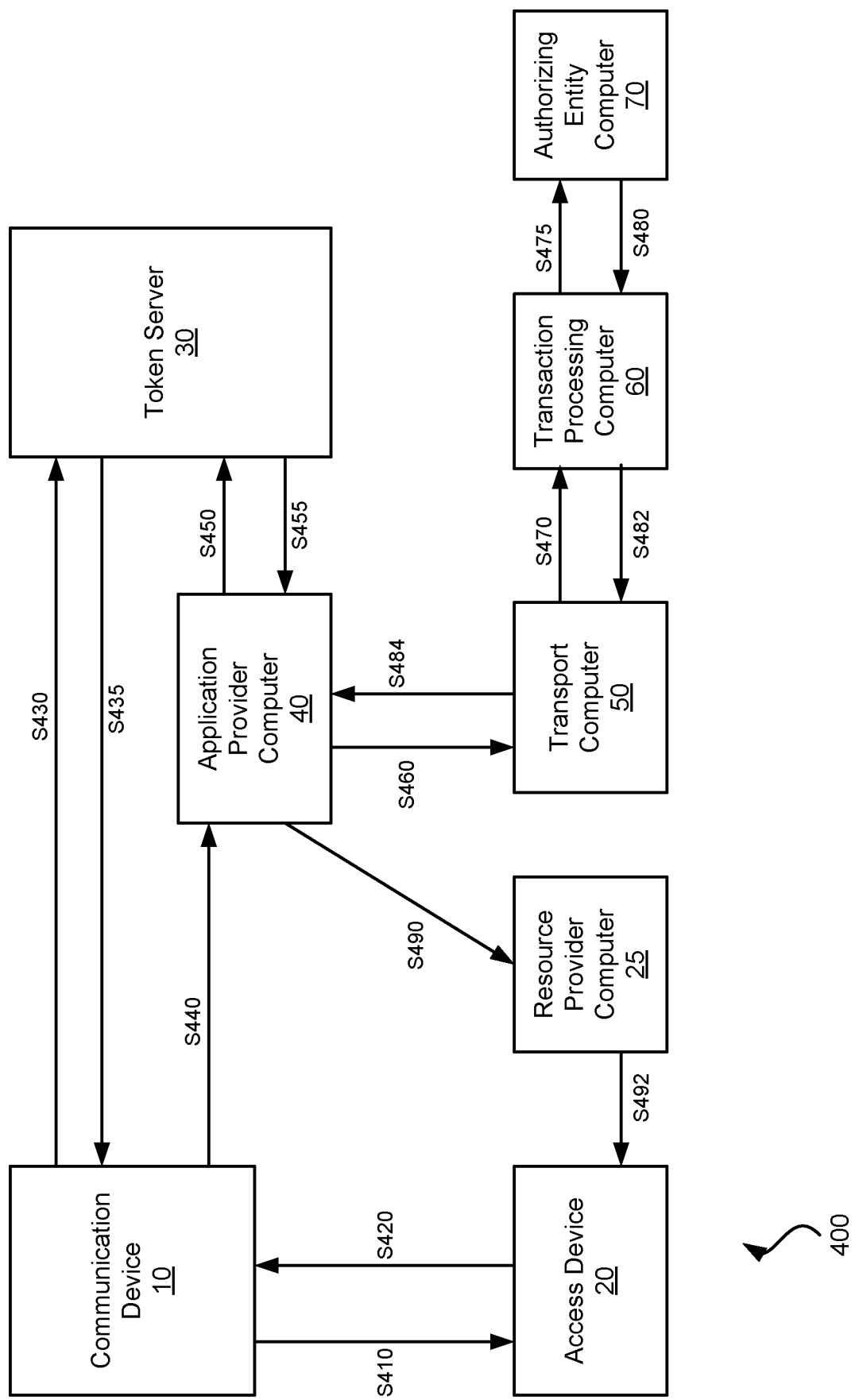
FIG. 4 shows a block diagram of a system and method for display and use of a code in a transaction processed through an application provider using a CVN according to some embodiments of the present invention.

FIG. 4 shows a block diagram of a system and method 400 for display and use of a code in a transaction processed through an application provider using a CVN according to some embodiments of the present invention. Steps S410-S440 may be as described above with respect to steps S310-S340 of FIG. 3. The transaction data may include a transaction type flag which, in this embodiment, indicates that a CVN transaction will be used.

At step S450, the application provider computer 40 may decrypt the encrypted transaction data, the token, and the CVN, and validate the decrypted data. The application provider computer 40 may route the token and CVN to the token server 30 for detokenization. At step S455, the token server 30 may locate the sensitive information associated with the token, and provide the sensitive information to the application provider computer 40. At step S460, the application provider computer 40 may encrypt the transaction data, and may route the encrypted transaction data and sensitive information for the transaction (including the PAN) to a transport computer 50. The transport computer 50 may decrypt the transaction data and the sensitive information. The transport computer 50 may generate an authorization request message with this information and may transmit it to the authorizing entity computer 70 via the transaction processing computer 60 in steps S470 and S475. The authorizing entity computer 70 may then generate an authorization response message. In steps S480 and S482, the authorization response message may be transmitted to the transport computer 50 via the transaction processing computer 60.

The transport computer 50 may forward the authorization response message to the application provider computer 40 at step S484. At step S490, the application provider computer 40 may provide the authorization response message to the resource provider computer 25. At step S492, the resource provider computer 25 may provide the authorization response message (or some indication of authorization) to the access device 20. In one embodiment, the user of the communication device 10 may then be provided with a receipt or other proof of completion of the transaction. A clearing and settlement process may occur at the end of the day or at any other suitable time after completion of the transaction.

Figure 5:
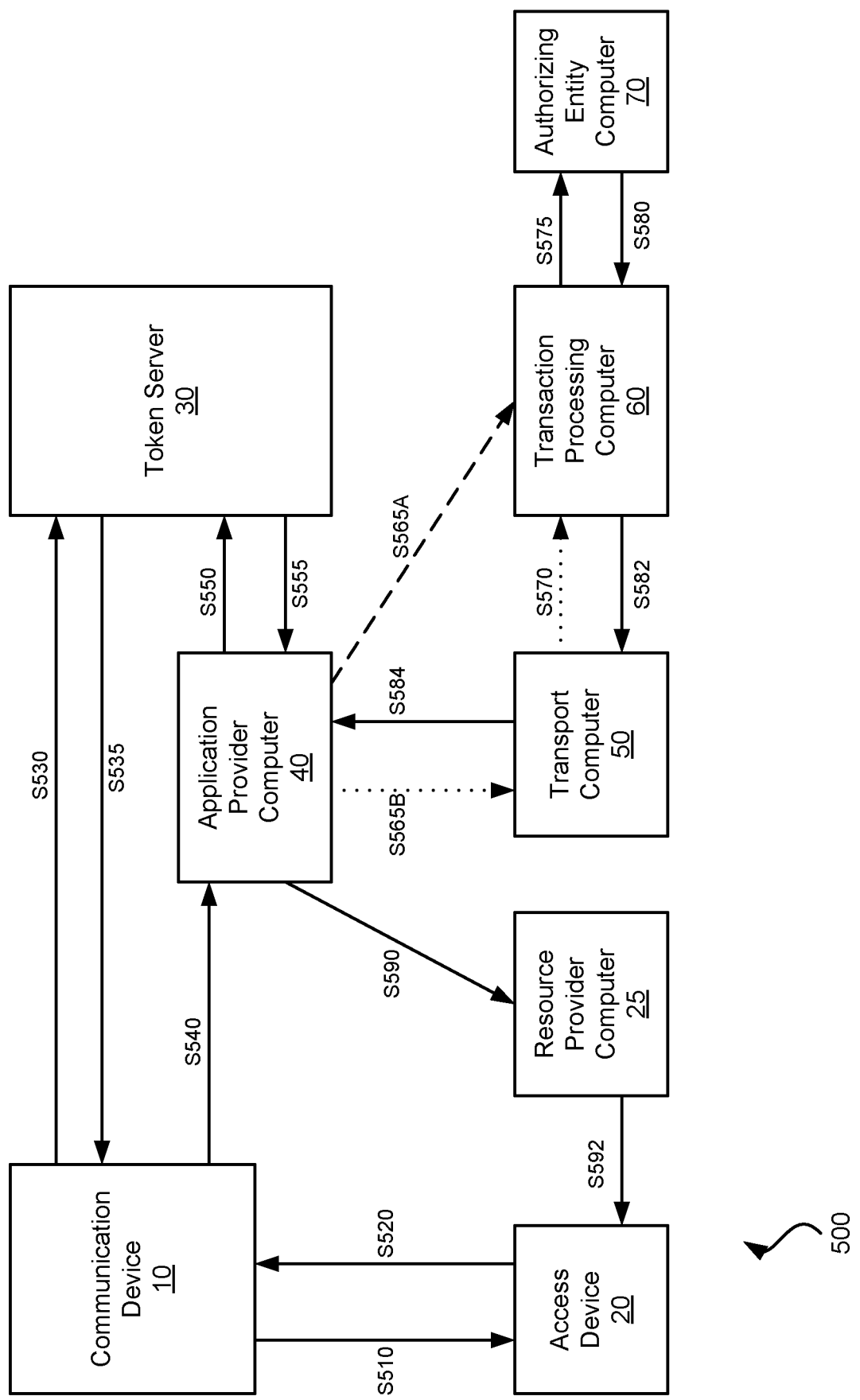
FIG. 5 shows a block diagram of a system and method for display and use of a code in a transaction using a token authentication verification value (TAVV) according to some embodiments of the present invention.

FIG. 5 shows a block diagram of a system and method for display and use of a code in a transaction using a token authentication verification value (TAVV) according to some embodiments of the present invention. In the embodiment shown in FIG. 5, a TAVV is used to complete the transaction, as described herein. Further, the embodiment of FIG. 5 may be representative of a card not present (CNP) or eCommerce transaction in some embodiments. Steps S510 to S555 may be as described above with respect to steps S410 to S455 of FIG. 4. However, in this embodiments, the transaction data may include a transaction type flag which indicates that a TAVV transaction will be used, and a TAVV will be routed amongst the parties described above instead of a CVN.

The application provider computer 40 may either (A) route encrypted authorization data for the transaction (including transaction data and the sensitive information) to a transport computer 50 at step 565B, which may then decrypt the transaction data and the sensitive information, then generate an authorization request message including the transaction data and the sensitive information. The authorization request message may then be routed to the transaction processing computer 60 at step S570 (indicated by the dotted line path). Or, the application provider computer 40 may (B) route encrypted transaction data for the transaction and the sensitive information directly to the transaction processing computer 60 at step S665A (indicated by the dashed line path), which may then decrypt the encrypted transaction data and the sensitive information, and generate an authorization request message. In either embodiment, the transaction processing computer 60 may forward the authorization request message to an authorizing entity computer 70 for authorization at step S575. Steps S580 to S592 may proceed as described above with respect to steps S480 to S492 of FIG. 4.

Figure 6:
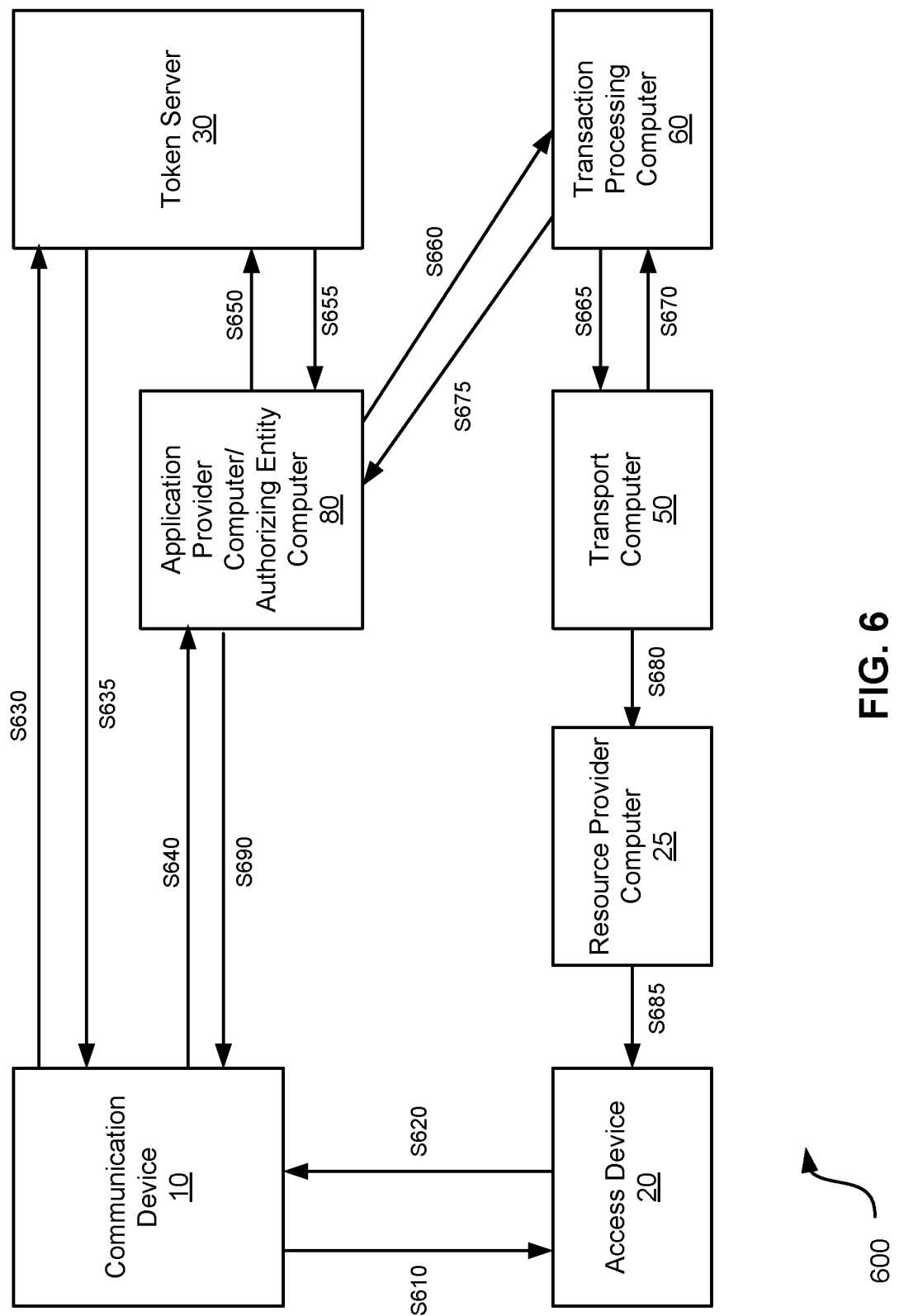
FIG. 6 shows a block diagram of a system and method for display and use of a code in an original credit transaction (OCT) according to some embodiments of the present invention.

FIG. 6 shows a block diagram of a system and method 600 for display and use of a code in an original credit transaction (OCT) according to some embodiments of the present invention. In the embodiment shown in FIG. 6, the transaction may utilize an original credit transaction (OCT). OCTs are described further in U.S. Pat. No. 8,016,185 B2, which is herein incorporated by reference in its entirety. Steps S610 to S635 may proceed as described above with respect to steps S310 to S335 of FIG. 3. However, in this embodiment, the transaction data may include a transaction type flag which indicates that an OCT transaction will be used, and the steps described above will be modified to include an OCT transaction type flag instead.

At step S640, the application on the communication device may encrypt the transaction data, as well as the token, and provide it to a joint application provider computer/authorizing entity computer 80. The application provider computer/authorizing entity computer 80 may be both the provider of the application on the communication device and the issuer of the payment device associated with the token. Although described herein as being a joint entity, it is contemplated that in other embodiments, the application provider computer and the authorizing entity computer may be separate. Further, it is contemplated that any of the embodiments described herein may be implemented with either a joint or separate application provider computer and authorizing entity computer.

At step S650, the application provider computer/authorizing entity computer 80 may decrypt the transaction data and the token, and may validate the transaction data. It may then route the token to the token server 30 for detokenization. At step S655, the token server 30 may locate the sensitive information associated with the token, and provide the sensitive information to the application provider computer/authorizing entity computer 80. At step S660, the application provider computer/authorizing entity computer 80 may route the OCT transaction data to the transaction processing computer 60. At step S665, the transaction processing computer 60 may forward the OCT transaction data to the transport computer 50. The transport computer 50 may formulate an OCT response that is sent to the transaction processing computer 60 at step S670, and to the application provider computer/authorizing entity computer 80 at step S675. At step S680, the transport computer 50 may further provide the OCT response to the resource provider computer 25. At step S685, the resource provider computer 25 may provide the OCT response to the access device 20, and the OCT transaction may be complete. In one embodiment, the user of the communication device 10 may then be provided with a receipt or other proof of completion of the transaction. A clearing and settlement process may occur at the end of the day or at any other suitable time after completion of the transaction.

Figure 7:
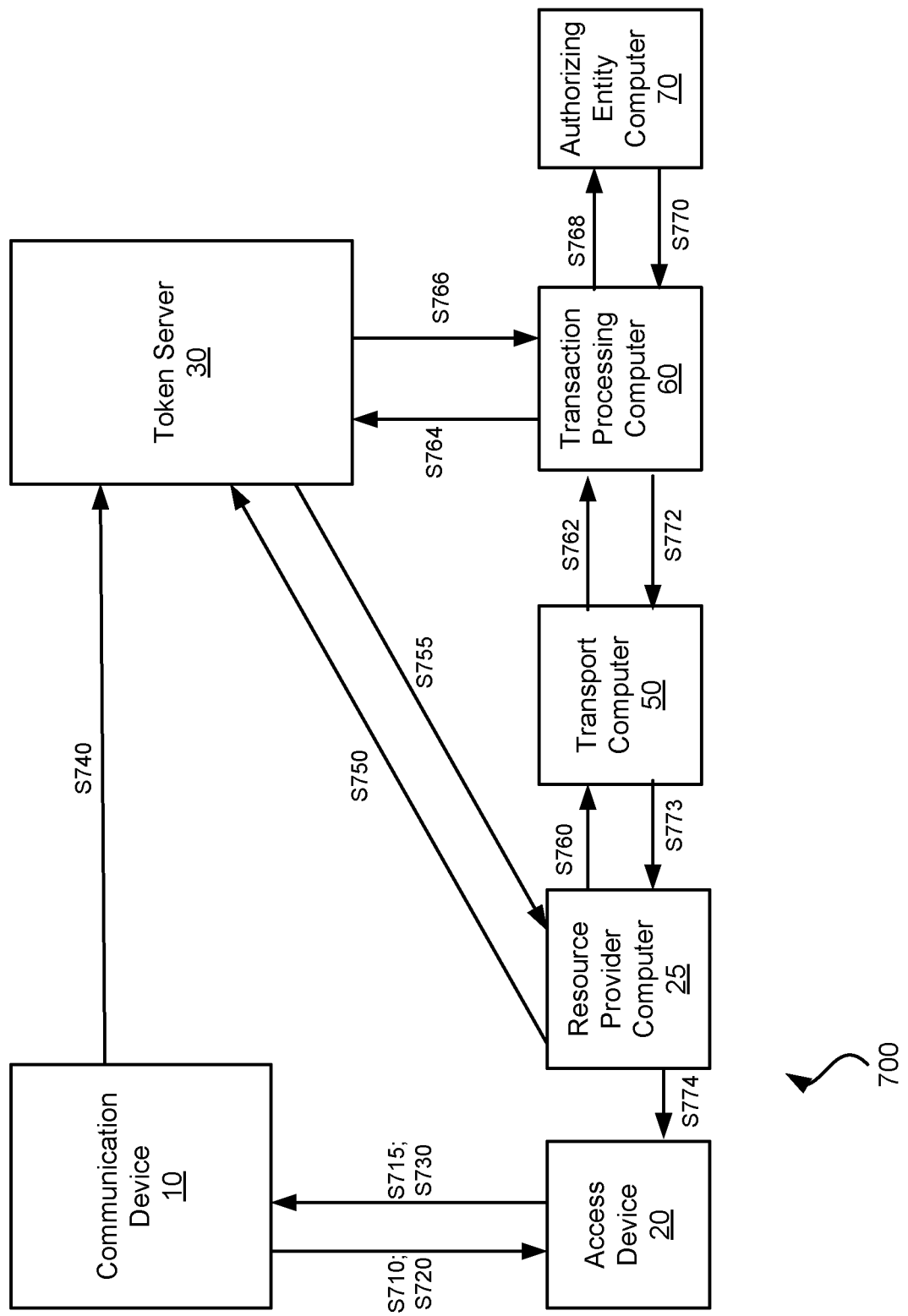
FIG. 7 shows a block diagram of a system and method for display and use of a code in a transaction in which a token is communicated to the resource provider according to some embodiments of the present invention.

FIG. 7 shows a block diagram of a system and method 700 for display and use of a code in a transaction in which a token is communicated to the resource provider computer 25 according to some embodiments of the present invention. In the embodiment shown in FIG. 7, both the communication device 10 and the resource provider computer 25 may communicate with the token server 30 to complete the transaction between the user and the resource provider, as described further herein. At step S710, a user of the communication device 10 may select a tender type at the access device 20. At step S715, the access device 20 may generate a code representing the tender type. At step S720, the user of the communication device 10 may open an application and use the communication device 10 to scan a code at the access device 20. The communication device 10 may scan the code using a camera incorporated into the communication device 10, for example. The code may be a QR code, a barcode, or any other code used to represent data. At step S730, the application residing on the communication device may decode the code to extract transaction data, and optionally display the transaction data associated with the code to the user. The transaction data may further be confirmed by the user at step S730.

At step S740, the application on the communication device 10 may communicate with a token server 30 to request a token associated with sensitive information of the user selected by the user to perform the transaction. The communication device 10 may further provide the token server 30 with at least some of the transaction data in order for the token server 30 to be able to uniquely identify the underlying transaction. For example, the communication device 10 may provide the token server 30 with a transaction identifier.

At step S750, the resource provider computer 25 may send a request for the token associated with the communication device 10 in order to complete the transaction. This may be done substantially contemporaneously with steps S730 and/or S740. The request may include identifying transaction data, such as the transaction identifier previously provided by the communication device 10, for example. At step S755, the token server 30 may retrieve the token associated with the identifying transaction data, and provide it to the resource provider computer 25. Although shown as being in direct communication with the token server 30, it is contemplated that an application provider computer 40 may act as a middleman between the resource provider computer 25 and the token server 30 in one embodiment.

Authorization processes may then conducted. For example, at step S760, the resource provider computer 25 may construct an authorization request message with the token and the transaction data and submit it to a transport computer 50. The transport computer 50 may forward the authorization request message to a transaction processing computer 60 at step S762. At step S764, the transaction processing computer 60 may request the sensitive information associated with the token from the token server 30, and receive it at step S764. At step S768, the transaction processing computer 60 may replace the token with the PAN in the authorization request message, and forward it to an authorizing entity computer 70 for authorization.

At step S770, the authorizing entity computer 70 may send an authorization response message (i.e., denying or allowing the transaction based on available funds, etc.) to the transaction processing computer 60, which may forward the authorization response message to the transport computer 50 at step S772. The transport computer 50 may forward the authorization response message to the resource provider computer 25 at step S773. At step S774, the resource provider computer 25 may forward the authorization response message to the access device 20 at step S774. In one embodiment, the user of the communication device 10 may then be provided with a receipt or other proof of completion of the transaction. A clearing and settlement process may occur at the end of the day or at any other suitable time after completion of the transaction.

For simplicity of illustration, a certain number of components are shown in FIGS. 1-7. It is understood, however, that embodiments of the invention may include more than one of each component. Some embodiments of the invention may include fewer than or greater than all of the components shown in FIGS. 1-7. Further, some embodiments of the invention may combine any of the separately illustrated components. For example, in some embodiments, the transaction processing computer 60 may be combined with the token server 30 and/or the gateway computer 45, the application provider computer 40 may be combined with the authorizing entity computer 70, and/or the like. It is also contemplated that some of the components described herein may perform duplicate functionalities, e.g., both the transaction processing computer 60 and the authorizing entity computer 70 may perform detokenization functions in conjunction with the token server 30. The components shown in FIGS. 1-7 may communicate via any suitable communication medium (including the Internet), using any suitable communications protocol.

Figure 8:
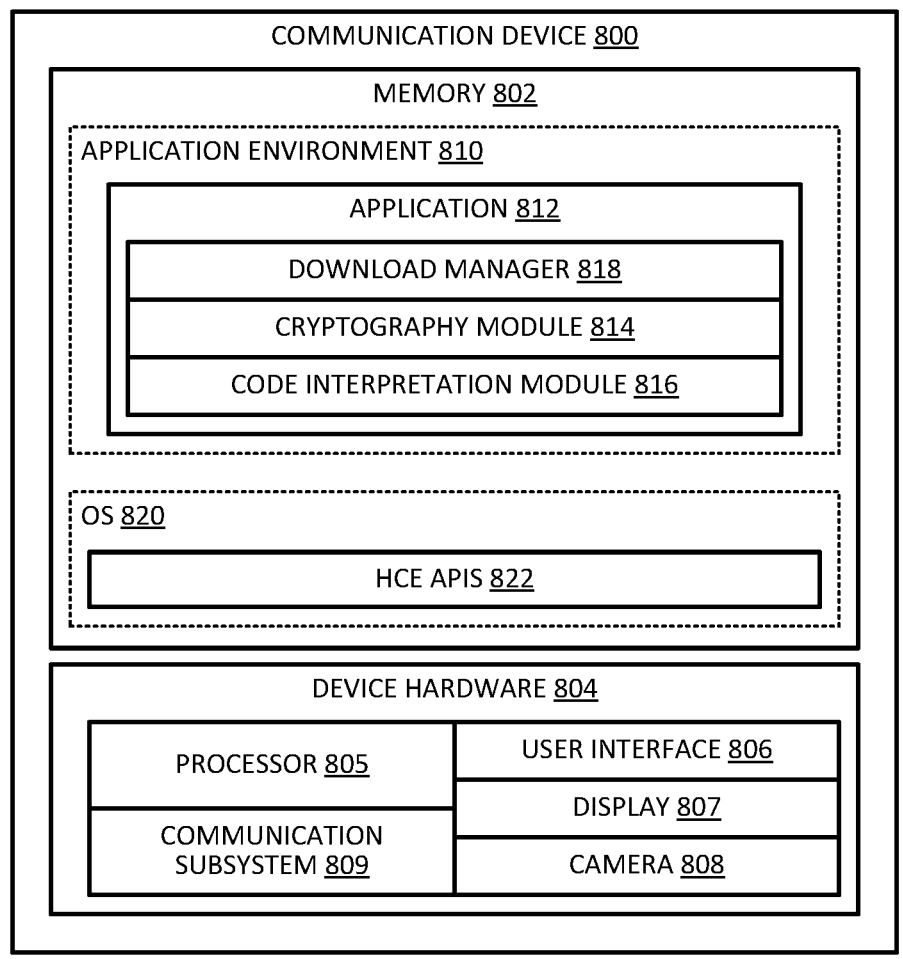
FIG. 8 shows a block diagram of a communication device according to some embodiments of the present invention.

FIG. 8 illustrates a block diagram of a communication device 800, according to some embodiments. Communication device 800 can be used, for example, to implement communication device 10. Communication device 800 may include device hardware 804 coupled to a memory 802. Device hardware 804 may include a processor 805, a communications subsystem 809, and a user interface 806. In some embodiments, device hardware 804 may include a display 807 (which can be part of user interface 806). Device hardware 804 may also include a camera 808, for example, which can be used as described herein to scan codes. However, embodiments of the invention are not limited to scannable codes. For example, additional hardware and/or software components may be included in communication device 800 to implement any communication protocol or technology to receive a code, including RF (contactless), Bluetooth, IR (infrared), etc.

Processor 805 can be implemented as one or more integrated circuits (e.g., one or more single core or multicore microprocessors and/or microcontrollers), and is used to control the operation of communication device 800. Processor 805 can execute a variety of programs in response to program code or computer-readable code stored in memory 802, and can maintain multiple concurrently executing programs or processes. Communications subsystem 809 may include one or more RF transceivers and/or connectors that can be used by portable communication device 800 to communicate with other devices and/or to connect with external networks. User interface 806 can include any combination of input and output elements to allow a user to interact with and invoke the functionalities of communication device 800. In some embodiments, user interface 806 may include a component such as display 807 that can be used for both input and output functions.

Memory 802 can be implemented using any combination of any number of non-volatile memories (e.g., flash memory) and volatile memories (e.g., DRAM, SRAM), or any other non-transitory storage medium, or a combination thereof media. Memory 802 may store an operating system (OS) 814 and an application environment 810 where one or more applications reside including application 812 to be executed by processor 805.

Application 812 can be an application that uses, accesses, and/or stores sensitive information or tokens when executed by the processor 805. For example, application 812 can be a wallet or payment application that uses a token to conduct transactions via communication device 800. In some embodiments, access to application 812 by a user can be protected by user authentication data such as a password, passcode, PIN, etc. For example, when a user attempts to launch or execute application 812, the user may be requested to enter valid user authentication data before the user can access application 812. Application 812 may include a download manager 818, a cryptography module 814, and a code determination module 816. In some embodiments, one or more of these components can be provided by another application or component that is not part of application 812.

Download manager 818 can be configured to provide functionalities to communicate with an application provider associated with application 812 to download information via the application provider. Download manager 818 may request or otherwise manage the acquisition and/or storage of sensitive information and/or tokens. For example, download manager 818 may request and obtain sensitive information or token via the application provider associated with application 812, and stored the sensitive information or token in sensitive information data store 816. In some embodiments, the sensitive information or token provided by the application provider can be received in an encrypted form. For example, the sensitive information or token can be encrypted with a session key generated by a token server. Download manager 818 may also receive, from the application provider, the session key in an encrypted form, and store the encrypted session key in a sensitive information data store.

Cryptography module 814 may provide cryptographic functionalities for application 812. For example, cryptography module 814 may implement and perform encryption/decryption operations for application 812 using encryption algorithms such as DES, AES, TDES/TDEA, or the like, and/or hash functions such as SHA, or the like. For example, when application 812 accesses data stores within memory 802 to retrieve and use sensitive information or tokens stored therein (e.g., to conduct a transaction), application 816 may invoke cryptography module 814 to decrypt the session key that is used to encrypt the stored sensitive information or token, and then decrypt the sensitive information or token using the decrypted session key. The decrypted sensitive information or token can then be used by application 812. Code determination module 816 may interpret or translate codes scanned by camera 808 into transaction data, as described further herein.

Figure 9:
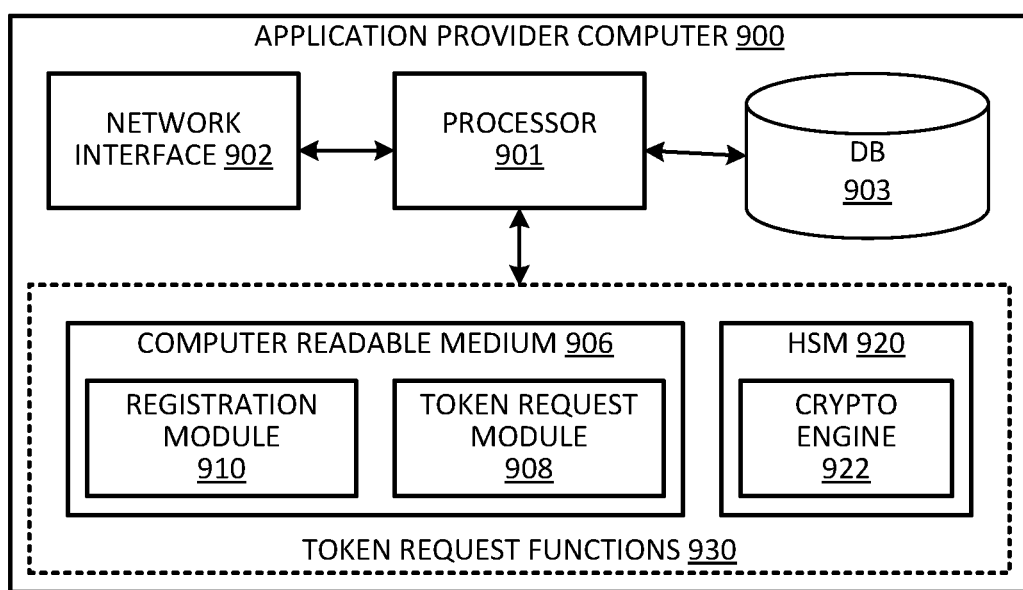
FIG. 9 shows a block diagram of an application provider computer according to some embodiments of the present invention.

FIG. 9 illustrates a block diagram of an application provider computer 900 associated with an application provider, according to some embodiments. For example, application provider computer 900 can be application provider computer 40 that provides a software application or services associated the application for a communication device. Application provider computer 900 may include a processor 901 coupled to a network interface 902 and a computer readable medium 906. In some embodiments, application provider computer 900 may also include a hardware security module (HSM) 920. Application provider computer 900 may also include or otherwise have access to a user database 903 that may be internal or external to application provider computer 900.

Processor 901 may include one or more microprocessors to execute program components for performing the token request functions 930 of application provider computer 900. Network interface 902 can be configured to connect to one or more communication networks to allow application provider computer 900 to communicate with other entities such as a communication device operated by a user, a token server computer, etc. Computer readable medium 906 may include any combination of one or more volatile and/or non-volatile memories, for example, RAM, DRAM, SRAM, ROM, flash, or any other suitable memory components. Computer readable medium 906 may store code executable by the processor 901 for implementing some or all of the token request functions 930 of application provider computer 900. For example, computer readable medium 906 may include code implementing a registration module 910 and a token request module 908. In some embodiments, application provider computer 900 may also include a hardware security module (HSM) 920 to implemented a cryptography engine 922.

Registration module 910 may, in conjunction with processor 901, register users with application provider computer 900. For example, a user can be registered with the application provider by providing registration module 910 with user identifying information to identify the user, device information such as a device identifier associated with the user's communication device on which an application associated with the application provider is installed, account information such as an account identifier associated with the user's account, etc. In some embodiments, a user may set up user authentication data (e.g., password, passcode, PIN, etc.) via registration module 910. The user authentication data can be used by application provider computer 900 to authenticate the user when the application on the user's communication device communicates with application provider computer 900. Registration module 910 may also allow a user to change or update the user authentication data. The registration information can be stored in a database 903. In some embodiments, the registration process can be carried out when the user first downloads the application for installation on the user's communication device, or when the user first launches and executes the application.

Token request module 908 is configured to, in conjunction with the processor 901, facilitate requests for sensitive information or tokens received from the application installed on a user's communication device. In some embodiments, upon receiving a request from the application on the user's communication device, token request module 908 may authenticate the user and/or the communication device by verifying the user authentication data and device identifier of the communication device against the previously registered information stored in database 903. Token request module 908 may then, in conjunction with processor 901, request the sensitive information or token from a token server for use on the communication device. When token request module 908 receives the sensitive information or token from the token server, token request module 908 may send the sensitive information or token to the application executing on the communication device. In some embodiments, token request module 908 may also, in conjunction with processor 901, track which sensitive information or token is provided to a particular communication device by storing this information in user database 903. Thus, user database 903 may include a mapping between a communication device and the sensitive information or token provisioned to that communication device.

Cryptography engine 922 may provide cryptographic functionalities for application provider computer 900. In some embodiments, cryptography engine 922 can be implemented in HSM 920, which is a specialized hardware component used to perform cryptographic operations and manage cryptographic keys. Cryptography engine 922 may, in conjunction with processor 901, implement and perform encryption/decryption operations for application provider computer 900 using encryption algorithms such as such as AES, DES, TDES/TDEA, or other suitable encryption algorithms using cryptographic keys of any length (e.g., 56-bit, 128-bit, 169-bit, 192-bit, 256-bit, etc.). In some embodiments, cryptography engine 922 can also, in conjunction with processor 901, perform hash calculations using hash functions such as secure hash algorithm (SHA), or the like. For example, when application provider computer 900 receives a session key used for encrypting sensitive information or token from a token server, application provider computer 900 may invoke cryptography engine 922 to encrypt the session key, such that session key can be provided to the application on the communication device in an encrypted form. In some embodiments, the session key can be encrypted using a hash value that is computed over the user authentication data associated with the user requesting the sensitive information or token.

Figure 10:
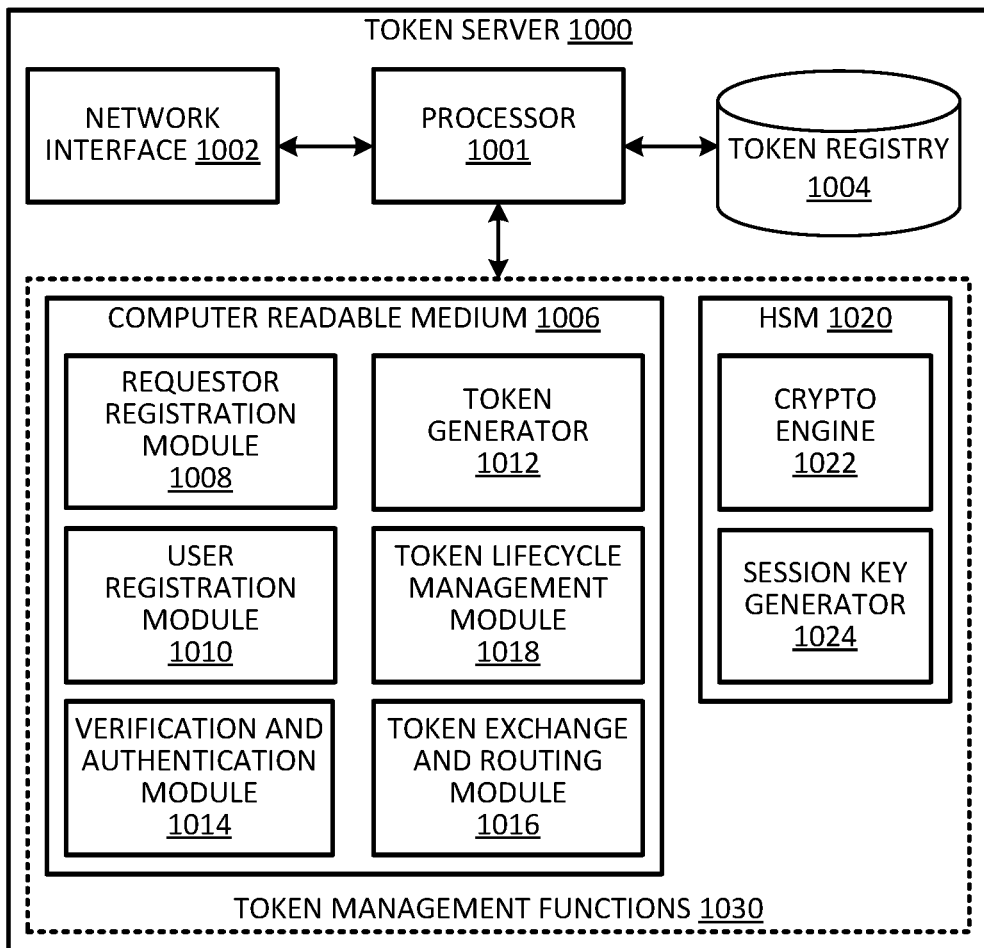
FIG. 10 shows a block diagram of a token server according to some embodiments of the present invention.

FIG. 10 illustrates a block diagram of a token server computer 1000 (e.g., token server 30), according to some embodiments. In some embodiments, one or more token server computers 1000 can be used, for example, to implement a network token system. Token server computer 1000 may include a processor 1001 coupled to a network interface 1002 and a computer readable medium 1006. In some embodiments, token server computer 1000 may also include a hardware security module (HSM) 1020. Token server computer 1000 may also include a token registry 1004 that may be internal or external to token server computer 1000.

Processor 1001 may include one or more microprocessors to execute program components for performing the token management functions 1030 of token server computer 1000. Network interface 1002 may be configured to connect to one or more communication networks to allow token server computer 1000 to communicate with other entities such as a communication device operated by a user, an application provider computer or a token request computer, merchant computer, acquirer computer, transaction processing network computer, issuer computer, etc. Computer readable medium 1006 may include any combination of one or more volatile and/or non-volatile memories, for example, RAM, DRAM, SRAM, ROM, flash, or any other suitable memory components. Computer readable medium 1006 may store code executable by the processor 1001 for implementing some or all of the token management functions 1030 of token server computer 1000 described herein. For example, computer readable medium 1006 may include a requestor registration module 1008, a user registration module 1010, a token generator 1012, a verification and authentication module 1014, a token exchange and routing module 1016, and a token life-cycle management module 1018.

Requestor registration module 1008 may, in conjunction with processor 1001, register a token requestor entity (e.g., application provider) with the token registry 1004, and to generate a token requestor identifier (ID) for the registered entity. Each registered entity can use their respective token requestor ID as part of a token service request to facilitate identification and validation of the entity. In some embodiments, a token requestor entity may provide token requestor information to the requestor registration module 808 such as an entity name, contact information, an entity type (e.g., merchant, wallet provider, payment service provider, issuer, payment enabler, acquirer, etc.). In some embodiments in which the token is transaction related, the token requestor information may also include token presentment modes (e.g., scan, contactless, e-commerce, etc.), token type (e.g., static/dynamic, payment/non-payment), integration and connectivity parameters, and services subscribed (e.g., token request, authentication and verification, life-cycle management, etc.) and any other relevant information for the onboarding process.

User registration module 1010 may, in conjunction with processor 1001, perform registration of users and accounts of the users. In some embodiments, token server computer 1000 may allow authorized entities to register consumer accounts (e.g., payment or financial accounts) with the network token system on behalf of the users. For example, a registered token requestor may provide a token requestor ID (e.g., received at the time of registration from the requestor registration module 1008), an account identifier or other sensitive information or sensitive information identifier for which a token can substitute, a consumer name and contact information, device identifier of the consumer's communication device, a token type, and any other relevant information for individual account registration or bulk account registration. In some embodiments, user registration module 1010 may, in conjunction with processor 1001, store the account details and sensitive information in token registry 1004 for all successful activation and registration requests. In some embodiment, an authorized entity may also unregister users and accounts by providing the necessary information to token server computer 1000.

Token generation module 1012 can be configured to, in conjunction with processor 1001, generate a token or retrieve sensitive information in response to processing a request for a token or sensitive information from a token requestor (e.g., an application provider), in conjunction with processor 1001. Further, token generation module 1012 can be configured with the processor 1001 to generate verification values, such as CVNs and TAVVs. In some embodiments, token generation module 1012 may receive a token requestor ID and an account identifier or sensitive information identifier. In some embodiments, token generation module 1012 may also receive optional information such as a user name, a user address and zip code, a requested token or sensitive information type (e.g., static, dynamic, non-payment, etc.), device identifier, and/or suitable information. In some embodiments, token generation module 1012 may generate a response with the requested token or requested sensitive information, a token expiration date associated with the token, and/or a token assurance level associated with the token. In some embodiments, token generation module 1012 may, in conjunction with the processor 1001, validate the token requestor ID and maintain the correlation between the token, the sensitive information or account identifier being substituted by the token, and the associated token requestor. In some embodiments, token generation module 1012 may, in conjunction with the processor 1001, determine if a token already exists in token registry 1004 for a token request before generating a new token. In some embodiments, if a token cannot be provisioned, the token response may include a corresponding reason code. In some embodiments, token generation module 1012 may also, in conjunction with the processor 1001, provide an interface to the token requestors to submit a bulk token request file.

In some embodiments, the token may be generated on the fly using API calls. For example, when a request is received to tokenize an account identifier or other sensitive information, token generation module 1012 may determine a token range to assign the token. The token range may be assigned based on whether the issuer is provisioning the token (e.g., issuer assigned token range) or the transaction processing network is provisioning the token on behalf of the issuer (e.g., transaction processing network assigned token range). As an example, if the transaction processing network assigned token range includes "442400000-442400250," then "4424000000005382" may be assigned as a token value. Token registry 1004 may store the relationship of the token range to the account identifier, and a token add record may be logged. In some embodiments, token generation module 1012 may consider the token range list associated with the account identifier range before assigning a token.

Verification and authentication module 1014 may be configured with the processor 1001 to execute a consumer verification and authentication process, and determine a token assurance level based on the outcome of the verification and authentication process. For example, the verification and authentication module 1014 can, in conjunction with the processor 1001, perform consumer authentication and verification through a configured authentication scheme. In some embodiments, the authentication scheme may include verification of the account identifier, verification values, and the expiration date based on the customer information stored in a database associated with the transaction processing network. In some embodiments, the authentication scheme may include direct verification of the consumer by the issuer using consumer credentials for their online banking system.

In some embodiments, the authentication scheme may include verification of the consumer credentials through the issuer ACS (Access Control Server). For example, the issuer ACS service may be part of an authentication protocol such as 3-D secure protocol by Visa®. The ACS server may be associated with an issuer that may include registered consumer account and access information. The ACS can give issuers the ability to authenticate a consumer during an online purchase, thereby reducing the likelihood of fraudulent use of the consumer account. For example, the ACS can validate that the consumer is registered, performs consumer verification at the time of the transaction, and provides digitally signed responses to the merchants. In some embodiments, the authentication scheme may include verification of the account using a transaction processing network consumer authentication service (e.g., Visa™ Consumer Authentication Service (VCAS)). For example, the VCAS service can authenticate the consumer on-behalf of the issuer prior to the authorization process.

In some embodiments, user registration, token generation, and verification and authentication may be performed as part of processing a single token request process. In some embodiments, for bulk requests, user registration and token generation may be performed by processing a bulk file from the token requestor. In such embodiments, consumer verification and authentication may be performed in a separate step. In some embodiments, the token requestor can request that the authentication and verification process be performed independently multiple times for a particular account to reflect any changes to the levels of assurance for the token over time.

Token exchange and routing module 1016 may, in conjunction with the processor 1001, process requests for the underlying sensitive information (e.g., an account identifier) associated with a given token. For example, a transaction processing computer, acquirer, issuer, etc. may issue a request for a token exchange during processing of a transaction. Token exchange and routing module 1016 may, in conjunction with the processor 1001, validate that the requesting entity is entitled to make a request for a token exchange. In some embodiments, token exchange and routing module 1016 may, in conjunction with the processor 1001, validate the account identifier (or other sensitive information) to token mapping and presentment mode based on the transaction timestamp and the token expiration timestamp. Token exchange and routing module 1016 may, in conjunction with the processor 1001, retrieve the account identifier (or other sensitive information) from token registry 1004, and provide it along with the assurance level to the requesting entity. In some embodiments, if the account identifier (or other sensitive information) to token mapping is not valid for the transaction timestamp and presentment mode, an error message may be provided.

Token life-cycle management module 1018 may, in conjunction with the processor 1001, perform life-cycle operations on the tokens managed by token server computer 1000. Life-cycle operations may include canceling a token, activating or deactivating a token, updating token attributes, renewing token with a new expiration date, etc. In some embodiments, a token requestor entity may provide a token requestor ID, a token number, a life-cycle operation identifier and one or more token attributes to token server computer 1000 to perform the requested life-cycle operation on a given token. Token life-cycle management module 1018 may, in conjunction with the processor 1001, verify the token requestor ID and the token association based on information in token registry 1004. Token life-cycle management module 1018 may, in conjunction with the processor 1001, perform the requested life-cycle operation on a given token, and update the corresponding associations in token registry 1004. Examples of life-cycle operation may include a token activation operation to activate an inactive, suspended, or temporarily locked token and its associations; a token de-activation operation to temporarily lock or suspend a token; a cancel token operation to permanently mark a token and its associations as deleted to prevent any future transactions, etc. In some embodiments, a deleted token may be used during returns/chargebacks if the same token was used to submit the corresponding original transactions.

According to some embodiments, token server computer 1000 may include a HSM 1020 to perform secure functions such as encryption and decryption operations and generation of cryptographic keys used for the encryption and decryption operations. For example, HSM 1020 may include a cryptography engine 1022 to execute encryption algorithms such as AES, DES, TDES/TDEA, or other suitable encryption algorithms using cryptographic keys of any length (e.g., 56-bit, 128-bit, 169-bit, 192-bit, 256-bit, etc.). HSM 820 may also implement a session key generator 1024 to generate a session key for each token or sensitive information request that token server computer 1000 processes. The generated session key can be used to encrypt a token or sensitive information generated or retrieved for the request, and the token or sensitive information can be provided to the token requestor in an encrypted form. For example, for each request that token server computer 1000 receives and processes, session key generator 1024 may generate a session key that can be unique for each request received from the particular token requestor, or unique to each request associate with a particular user or account. In some embodiments, the session key can be the same or different than the encryption key that is used to establish the secure communication channel (e.g., TLS, SSL, etc.) between the token requestor and token server computer 1000. Token generator 1012 may generate or otherwise retrieve a token or sensitive information to fulfill the request. The session key can be used by cryptographic engine 1022 to encrypt that token or sensitive information using an encryption algorithm, and the encrypted token or sensitive information can be provided to the token requestor. In some embodiments, the generated session key is also provided to the token requestor with the encrypted token or sensitive information.

Although token server computer 1000 and application provider computer 900 have been described with a HSM implementing only some of their functions, it should be understood that other functionalities of the respective computers (e.g., token generation) can be implemented inside a HSM as well. Furthermore, some or all of the respective HSM functionalities can also be implemented outside of a HSM.

A computer system and/or server computer may be used to implement any of the entities or components described above. The subsystems of the computer system may be interconnected via a system bus. Additional subsystems such as a printer, keyboard, fixed disk (or other memory comprising computer readable media), monitor, which is coupled to display adapter, and others may be used. Peripherals and input/output (I/O) devices, which couple to an I/O controller (which can be a processor or other suitable controller), can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer readable medium. In some embodiments, the monitor may be a touch sensitive display screen.

A computer system can include a plurality of the same components or subsystems, e.g., connected together by an external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

Like reference numerals are used to indicate like elements throughout the figures.

What is claimed:

1. A method comprising:
    receiving, by a token server computer from an application provider computer in connection with a transaction between a user device of a user and an access device of a resource provider, a token request for a token, the token request comprising a token reference identifier;
    in response to receiving the token request from the application provider computer:
        retrieving, by the token server computer, the token using a stored mapping between the token reference identifier and the token, wherein the token is associated with an account of the user;
        providing, by the token server computer to the application provider computer, the token, wherein the application provider computer initiates an authorization request message including the token to authorize the transaction, wherein the authorization request message is received at a transaction processing computer without the token being exchanged between the user device and the access device and without the token being stored on the user device or the access device;
    receiving, by the token server computer from the transaction processing computer, the token, wherein the access device had no access to the token during the transaction;
    in response to receiving the token from the transaction processing computer:
        determining, by the token server computer, an account number representing the account of the user based on the token; and
        providing, by the token server computer, the account number to the a transaction processing computer, wherein the transaction processing computer processes the transaction using the account number.

2. The method of claim 1, wherein the application provider computer received the token reference identifier from the user device, the token reference identifier corresponding to the account of the user selected on the user device.

3. The method of claim 2 wherein prior to providing the token reference identifier to the application provider computer, the user device obtained transaction data from a code displayed by the access device, wherein the code is a QR code and the access device is a point of sale device.

4. The method of claim 1, wherein the token is derived from the account number by an algorithm.

5. The method of claim 1, wherein the application provider computer received the token reference identifier from an application on the user device, the application managed by the application provider computer.

6. The method of claim 1, wherein the token request also includes a request for a verification value.

7. The method of claim 1, wherein the token request also includes a request for a verification value, the verification value including a card verification number.

8. The method of claim 7, wherein the application provider computer generates a unique identifier after receiving the token from the token server computer and transmits the unique identifier, and the token, to the user device.

9. The method of claim 8, wherein the user device is a mobile phone.

10. A token server computer comprising:
    a processor; and
    a non-transitory computer readable medium coupled to the processor, the non-transitory computer readable medium comprising code executable by the processor, to perform operations including:
    receiving, from an application provider computer, a token request for a token in connection with a transaction between a user device of a user and an access device of a resource provider, a token request for a token, the token request comprising a token reference identifier;
    in response to receiving the token request from the application provider computer:
        retrieving the token using a stored mapping between the token reference identifier and the token, wherein the token is associated with an account of the user;
        providing, to the application provider computer, the token, wherein the application provider computer initiates an authorization request message including the token to authorize the transaction, wherein the authorization request message is received at a transaction processing computer without the token being exchanged between the user device and the access device and without the token being stored on the user device or the access device;

receiving, from the transaction processing computer, the token, wherein the access device had no access to the token during the transaction;

in response to receiving the token from the transaction processing computer:
  determining an account number representing the account of the user based on the token; and
  providing providing, by the token server computer, the account number to the a transaction processing computer, wherein the transaction processing computer processes the transaction using the account number.

11. The token server computer of claim 10, wherein the token request also includes a request for a verification value.

12. The token server computer of claim 10, wherein the token is derived from the account number by an algorithm.

13. The token server computer of claim 10, wherein determining the account number based on the token comprises using a look-up table to determine the account number.

14. A method comprising:
  displaying, by an access device to a communication device in a transaction, a scannable code, wherein the scannable code comprises transaction data, wherein the communication device decodes the scannable code, and transmits a token request message comprising a token reference identifier and the transaction data to an application provider computer, which provides the token reference identifier to a token server computer, receives a token from the token server computer in exchange for the token reference identifier, and initiates an authorization request message including the token to authorize the transaction, wherein the authorization request message is received at a transaction processing computer without the token being exchanged between the communication device and the access device and without the token being stored on the communication device or the access device;

receiving, by a resource provider computer in communication with the access device, an authorization response message for the transaction without the token being exchanged between the communication device and one or more of the resource provider computer or the access device, and without being stored on the communication device, the resource provider computer or the access device, wherein the access device had no access to the token during the transaction; and transmitting, by the resource provider computer to the access device, the authorization response message.

15. The method of claim 14, wherein the access device is a point of sale terminal and the communication device is a mobile phone.

16. The method of claim 14, wherein the resource provider computer is a merchant computer.

17. The method of claim 14, wherein the application provider computer initiates the authorization request message by generating the authorization request message.

18. The method of claim 17, wherein the authorization request message is transmitted to an authorizing entity computer, which authorizes the transaction.

* * * * *